(12) United States Patent
Shiomi et al.

(10) Patent No.: US 10,778,109 B2
(45) Date of Patent: Sep. 15, 2020

(54) POWER SUPPLY AND POWER SUPPLY UNIT

(71) Applicant: SHARP KABUSHIKI KAISHA, Sakai, Osaka (JP)

(72) Inventors: Takeshi Shiomi, Sakai (JP); Akihide Shibata, Sakai (JP); Hiroshi Iwata, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/487,714

(22) PCT Filed: Jan. 29, 2018

(86) PCT No.: PCT/JP2018/002615
§ 371 (c)(1),
(2) Date: Aug. 21, 2019

(87) PCT Pub. No.: WO2018/155079
PCT Pub. Date: Aug. 30, 2018

(65) Prior Publication Data
US 2020/0235673 A1  Jul. 23, 2020

(30) Foreign Application Priority Data
Feb. 23, 2017  (JP) ................................ 2017-031949

(51) Int. Cl.
*H02M 3/335* (2006.01)
*H02M 1/42* (2007.01)

(52) U.S. Cl.
CPC ..... *H02M 3/33592* (2013.01); *H02M 1/4233* (2013.01); *H02M 3/33546* (2013.01); *H02M 2001/4283* (2013.01)

(58) Field of Classification Search
CPC ..... H02M 3/33553; H02M 2001/0058; H02M 3/158; G05F 1/00
See application file for complete search history.

(56) References Cited

U.S. PATENT DOCUMENTS

2002/0118551 A1*  8/2002  Ishii ................. H02M 3/33561
363/16
2002/0181253 A1  12/2002  Watanabe
(Continued)

FOREIGN PATENT DOCUMENTS

JP  H03-040757 A  2/1991
JP  H07-194114 A  7/1995
(Continued)

*Primary Examiner* — Adolf D Berhane
*Assistant Examiner* — Afework S Demisse
(74) *Attorney, Agent, or Firm* — ScienBiziP, P.C.

(57) ABSTRACT

A power supply includes a primary circuit connected to a primary winding of a transformer and a secondary circuit connected to a secondary winding of the transformer. The primary circuit includes MOSFETs, and the secondary circuit includes MOSFETs configured to rectify power transmitted from a primary side of the transformer and includes a capacitor configured to store the rectified power. The secondary circuit performs a discharge operation of discharging the capacitor and causing a current to flow into the secondary winding of the transformer to reduce a source-drain voltage of the MOSFETs before the MOSFETs are switched from an off state to an on state. Thus, the power supply having a high power-conversion efficiency even during low output is provided.

14 Claims, 36 Drawing Sheets

(56) References Cited

U.S. PATENT DOCUMENTS

| | | |
|---|---|---|
| 2002/0191422 A1 | 12/2002 | Takagi et al. |
| 2011/0194206 A1 | 8/2011 | Sase et al. |
| 2014/0140103 A1 | 5/2014 | Nishimura |
| 2015/0256087 A1* | 9/2015 | Jitaru ................ H02M 3/33592 363/21.06 |
| 2017/0019032 A1 | 1/2017 | Saggini et al. |

FOREIGN PATENT DOCUMENTS

| | | |
|---|---|---|
| JP | 2002-354799 A | 12/2002 |
| JP | 2003-047245 A | 2/2003 |
| JP | 2003-052175 A | 2/2003 |
| JP | 2011-166949 A | 8/2011 |
| JP | 2014-180111 A | 9/2014 |

* cited by examiner

POWER SUPPLY AND POWER SUPPLY UNIT

TECHNICAL FIELD

The disclosure relates to a power supply and a power supply unit including the power supply.

The present invention relates to a power supply and a power supply unit including the power supply.

BACKGROUND ART

As a power supply that outputs direct current (DC) voltage, a DC/DC converter including a full-bridge circuit and a transformer is widely used. The full-bridge circuit includes two pairs of switching elements, each pair including two switching elements connected in series. In the full-bridge circuit illustrated in FIG. 36, a first switching element pair includes an upper arm element Sa and a lower arm element Sb, and a second switching element pair includes an upper arm element Sc and a lower arm element Sd. The upper arm element Sa and the lower arm element Sb operate in a complimentary manner (one turns off in a case that the other turns on), and the upper arm element Sc and the lower arm element Sd also operate in a complimentary manner. In a typical full-bridge circuit, the upper arm element Sa and the lower arm element Sd turn on and off at the same timing, and the lower arm element Sb and the upper arm element Sc also turn on and off at the same timing.

In a full-bridge circuit, it is necessary to reduce the loss in the switching elements. As a method for reducing the loss in the switching elements included in the full-bridge circuit, a phase-shift method of providing a phase difference between the operation timing of the upper arm element Sa and the operation timing of the lower arm element Sd and providing a phase difference between the operation timing of the lower arm element Sb and the operation timing of the upper arm element Sc is known. In the phase-shift method, after a source-drain voltage (or emitter-collector voltage) of the switching elements is reduced to substantially zero, the switching elements are turned on and off using power stored in a reactor provided on a current path of the full-bridge circuit. Thus, zero voltage switching of the switching elements is performed, making it possible to reduce the switching loss.

The phase-shift method is, for example, described in PTL 1. In PTL 2, there is described a power supply that, in order to perform zero voltage switching of the switching elements during low output, is configured to transmit power stored in an inductance included in a secondary circuit to a primary circuit via a transformer.

CITATION LIST

Patent Literature

PTL 1: JP 2003-47245 A
PTL 2: JP 2011-166949 A

SUMMARY

Technical Problem

In a DC/DC converter including a full-bridge circuit, the current that flows through the reactor during low output is small. Thus, during low output, the power stored in the reactor also becomes small, making it no longer possible to set the source-drain voltage (or emitter-collector voltage) of the switching elements to zero. As a result, during low output, zero voltage switching of the switching elements cannot be performed, causing an increase in switching loss and a decrease in power conversion efficiency.

Thus, in a DC/DC converter including a full-bridge circuit driven by the phase-shift method, the problem exists that the power conversion efficiency decreases during low output. While a power supply for solving this problem is described in PTL 2, a power supply configured to solve this problem by another method is also conceivable.

Accordingly, providing a power supply having a high power-conversion efficiency even during low output can be cited as a problem.

Solution to Problem

The above-described problems can be solved by a power supply including, for example, a transformer, a switching circuit connected to a primary winding of the transformer, and a rectifier circuit connected to a secondary winding of the transformer. The switching circuit includes a switching element including a first conduction electrode and a second conduction electrode and configured to be switchable between an on state and an off state. The rectifier circuit includes a rectifier element configured to rectify power transmitted from a primary side of the transformer and a capacitor configured to store the power that is rectified. The rectifier circuit is configured to perform a discharge operation of discharging the capacitor and causing a current to flow into the secondary winding of the transformer to reduce a voltage between the first conduction electrode and the second conduction electrode of the switching element before the switching element is switched from the off state to the on state.

Advantage Effects of Disclosure

According to the power supply described above, the capacitor included in the rectifier circuit is discharged, causing a current to flow into the secondary winding of the transformer, and the power stored in the capacitor is transmitted to the switching circuit via the transformer, reducing the voltage between the conduction electrodes of the switching element included in the switching circuit even during low output. After the voltage between the conduction electrodes is reduced, the switching element is switched to the on state, making it possible to reduce the switching loss in the switching element even during low output. In particular, after the voltage between the conduction electrodes is reduced to substantially zero, the switching element is switched to the on state, making it possible to perform zero voltage switching and reduce the switching loss even during low output. Thus, it is possible to provide a power supply that has a high power-conversion efficiency even during low output and is highly efficient across a wide output range from low output to high output.

DESCRIPTION OF EMBODIMENTS

First Embodiment

Figure 1:
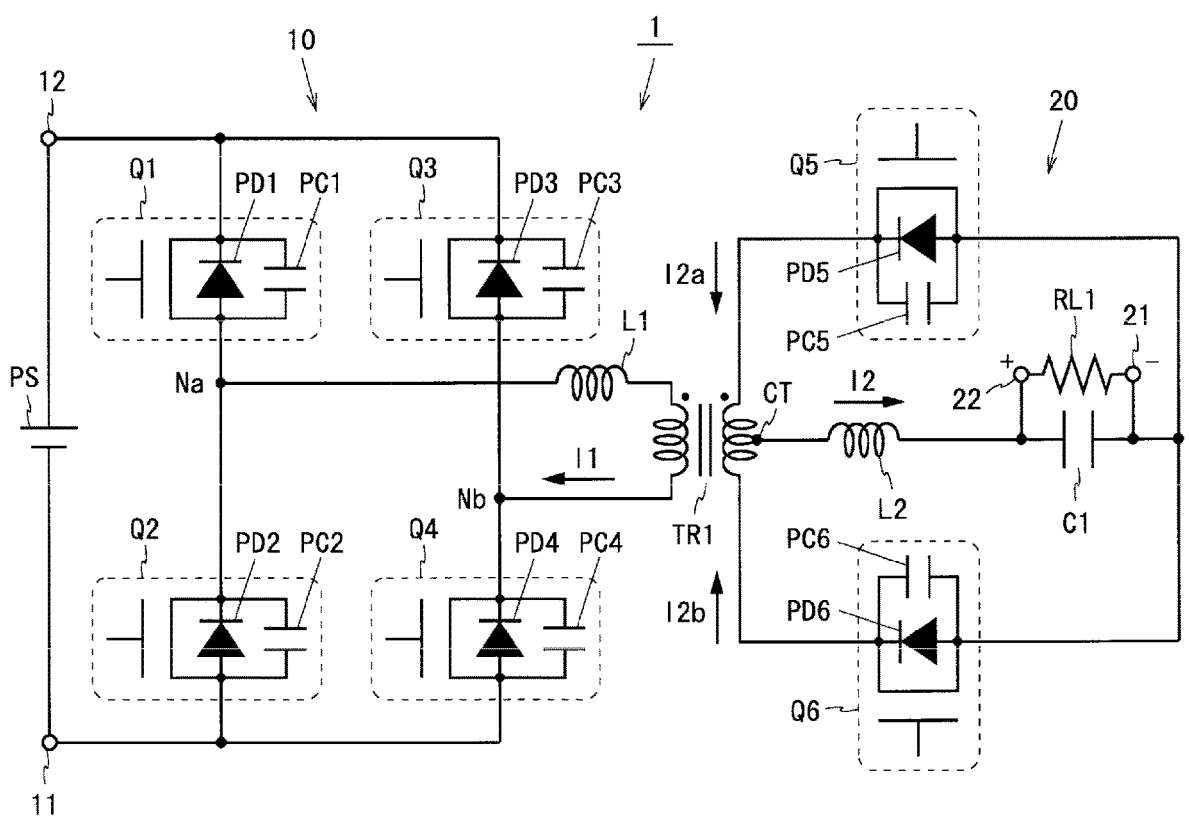
FIG. 1 is a circuit diagram of a power supply according to a first embodiment.

FIG. 1 is a circuit diagram of a power supply according to a first embodiment. A power supply 1 illustrated in FIG. 1 is a DC/DC converter including Metal Oxide Semiconductor Field Effect Transistors (MOSFETs) Q1 to Q6 of an N-channel type, a transformer TR1, coils L1, L2, and a capacitor C1. The MOSFETs Q1 to Q6 respectively include parasitic diodes PD1 to PD6 and parasitic capacitors PC1 to PC6. Note that in a case that an electrostatic capacitance of the parasitic capacitors PC1 to PC6 is insufficient, a capacitor may be externally connected in parallel to each of the parasitic capacitors PC1 to PC6.

The power supply 1 includes a primary circuit 10 on a primary side of the transformer TR1 and a secondary circuit 20 on a secondary side of the transformer TR1. The primary circuit 10 includes a first input terminal 11 as a negative input terminal and a second input terminal 12 as a positive input terminal. The secondary circuit 20 includes a first output terminal 21 as a negative output terminal and a second output terminal 22 as a positive output terminal. A direct current power supply PS is connected between the first and second input terminals 11, 12, and a load RL1 is connected between the first and second output terminals 21, 22. Hereinafter, the voltage supplied from the direct current power supply PS is referred to as Vin.

The MOSFETs Q1 to Q6 are each a switching element including a source electrode (first conduction electrode), a drain electrode (second conduction electrode), and a gate electrode (control electrode) and are switched between an on state (conductive state) and an off state (non-conductive state) in accordance with a gate potential. The primary circuit 10 includes the MOSFETs Q1 to Q4 and the coil L1. The secondary circuit 20 includes the MOSFETs Q5, Q6, the coil L2, and the capacitor C1.

In the primary circuit 10, the source electrode of the MOSFET Q2 is connected to the first input terminal 11, the drain electrode of the MOSFET Q2 is connected to the source electrode of the MOSFET Q1, and the drain electrode of the MOSFET Q1 is connected to the second input terminal 12. The two MOSFETs Q2, Q connected in series are thus provided between the first and second input terminals 11, 12. Further, the MOSFETs Q4, Q3 similarly connected in series are provided between the first and second input terminals 11, 12. Hereinafter, a node connected to the midpoint between the MOSFETs Q1, Q2 is referred to as Na, a node connected to the midpoint between the MOSFETs Q3, Q4 is referred to as Nb, and potentials of the nodes Na, Nb are referred to as Va, Vb, respectively. The nodes Na, Nb are connected with each other with the coil L1 and a primary winding of the transformer TR1 therebetween.

In the secondary circuit 20, the capacitor C1 is connected between the first and second output terminals 21, 22. The source electrodes of the MOSFETs Q5, Q6 are both connected to the first output terminal 21. The drain electrode of the MOSFET Q5 is connected to a first end (upper ends in the drawing) of a secondary winding of the transformer TR1. The drain electrode of the MOSFET Q6 is connected to a second end of the secondary winding of the transformer TR1. A center tap CT is provided on the secondary winding of the transformer TR1, and the center tap CT is connected to the second output terminal 22 with the coil L2 therebetween.

In this way, the primary circuit 10 is a switching circuit connected to the primary winding of the transformer TR1. This switching circuit is a full-bridge circuit. The secondary circuit 20 is a rectifier circuit connected to the secondary winding of the transformer TR1. This rectifier circuit is a center tap type full wave rectifier circuit. In the secondary circuit 20, a first end (right end in the drawing) of the capacitor C1 is connected to the first end of the secondary winding of the transformer TR1 with the MOSFET Q5 therebetween and is connected to the second end of the secondary winding of the transformer TR1 with the MOSFET Q6 therebetween. A second end of the capacitor C1 is connected to the center tap CT with the coil L2 therebetween. Both the MOSFETs Q5, Q6 are rectifier elements that rectify the power transmitted from the primary side of the transformer TR1, and the capacitor C1 stores the rectified power.

For the coils L1, L2, a coil having an inductance of from 10 to 100 pH, for example, is used. For the capacitor C1, a capacitor having a capacitance of from 20 to 1,000 μF, for example, is used. The inductance of the coils L1, L2 and the capacitance of the capacitor C1 may be values outside the ranges described above. Alternatively, a leakage magnetic flux of the transformer TR1 may be used in place of the coil L1.

Note that elements not required in the description of the operation of the circuits are omitted in the circuit diagram of the power supply. For example, while the power supply 1 is often provided with a capacitor between the first and second input terminals 11, 12 to rapidly supply a current to the full-bridge circuit, this capacitor is omitted in FIG. 1. In FIG. 1, a circuit for driving gate electrodes of the MOSFETs Q1 to Q6 is also omitted.

The primary circuit 10 generates an alternating current (a 100-kHz alternating current, for example) using a full-bridge circuit on the basis of the direct current supplied from the direct current power supply PS and supplies the generated alternating current to the primary winding of the transformer TR1. The transformer TR1 transforms the alternating current supplied to the primary winding and outputs the alternating current from the secondary winding. The secondary circuit 20 rectifies the transformed alternating current output from the secondary winding of the transformer TR1 to charge the capacitor C1. In this way, the power supply 1 converts the voltage level of the power supplied from the direct current power supply PS and supplies the power in the converted voltage to the load RL1.

The relationship between the level of the direct current voltage supplied to the first and second input terminals 11, 12 and the level of the direct current voltage output from the first and second output terminals 21, 22 is mainly determined by the winding ratio of the transformer TR1. For example, in a case that the power supply 1 is used as an AC adapter for a laptop personal computer, the output voltage of the power supply 1 may be set to 19 V using the output voltage (a voltage of 400 V, for example) of a power factor correction circuit as the voltage supplied from the direct current power supply PS.

Figure 2:
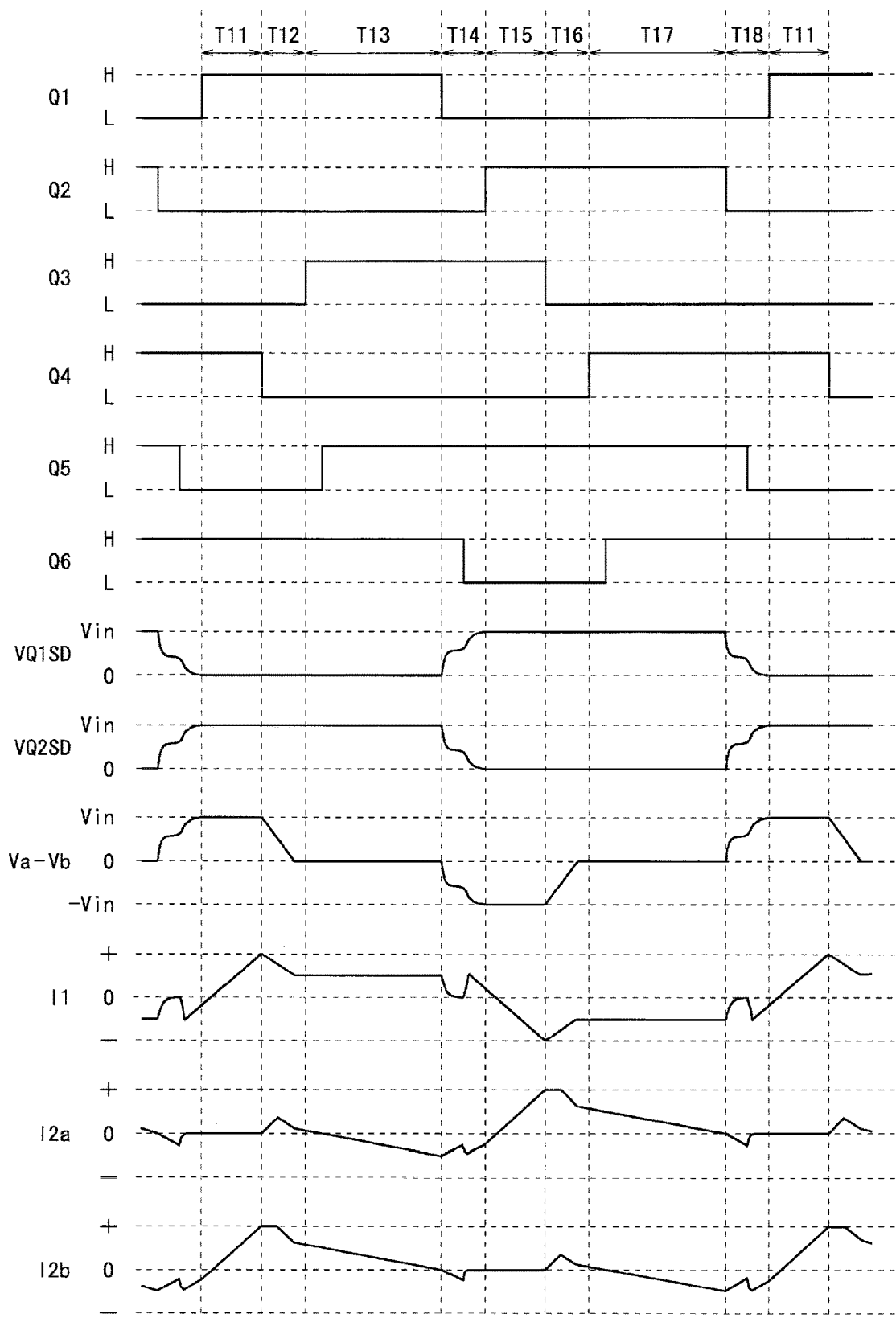
FIG. 2 is a timing chart of the power supply illustrated in FIG. 1.

The operation of the power supply 1 in a case that the output power is relatively small (that is, in a case that the load RL1 is light) will now be described with reference to FIG. 2 to FIG. 13. FIG. 2 is a timing chart of the power supply 1 in a case that the output power is relatively small. FIG. 2 illustrates changes in the gate potential of the MOSFETs Q1 to Q6, a source-drain voltage VQ1SD of the MOSFET Q1, a source-drain voltage VQ2SD of the MOSFET Q2, a potential difference (Va−Vb) between the nodes Na, Nb, a current I1 flowing through the primary winding of the transformer TR1, a current I2a flowing through the MOSFET Q5, and a current I2b flowing through the MOSFET Q6. The MOSFETs Q1 to Q6 are turned on in a case that the gate potential is at a high level (denoted as H in the drawing) and turned off in a case that the gate potential is at a low level (denoted as L in the drawing). One cycle of operation of the power supply 1 is divided into eight periods T11 to T18.

Figure 3:
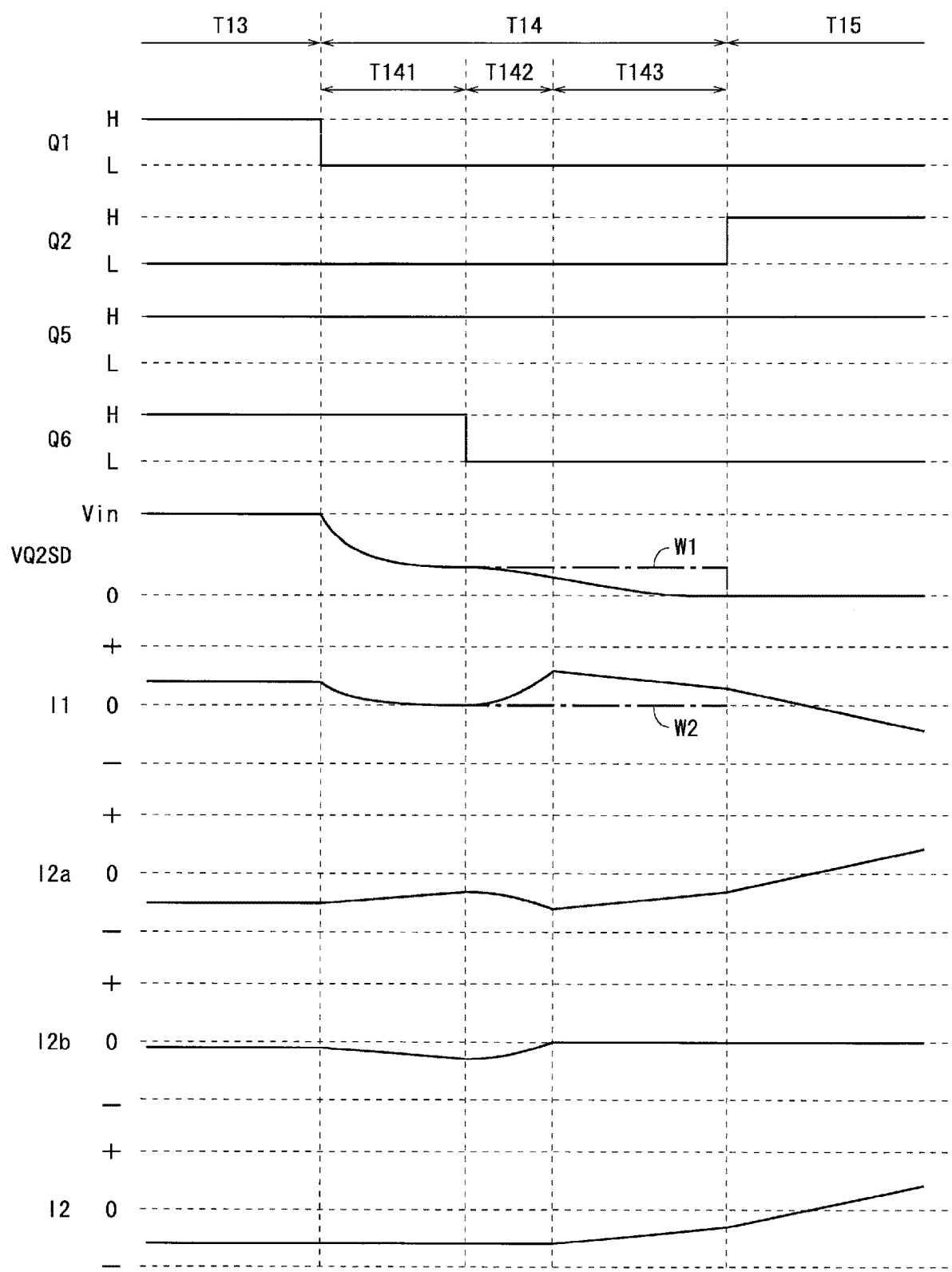
FIG. 3 is a diagram illustrating a portion of the timing chart illustrated in FIG. 2 in detail.

FIG. 3 is a diagram illustrating a portion of the timing chart illustrated in FIG. 2 in detail. In FIG. 3, the entire period T14 and portions of the periods T13, T15 are illustrated in an enlarged view. FIG. 3 illustrates the change in the current I2 flowing through the coil L2 in place of the changes in the gate potential of the MOSFETs Q3, Q4, the voltage VQ1SD, and the potential difference (Va−Vb). The current I2 is the sum of the currents I2b (I2=I2a+I2b). In a case that the current flowing through the load RL1 is negligible, the current I2 is equal to the current flowing through the capacitor C1. The positive orientations of the currents I1, I2a, I2b, I2 are as described in FIG. 1.

Figure 4:
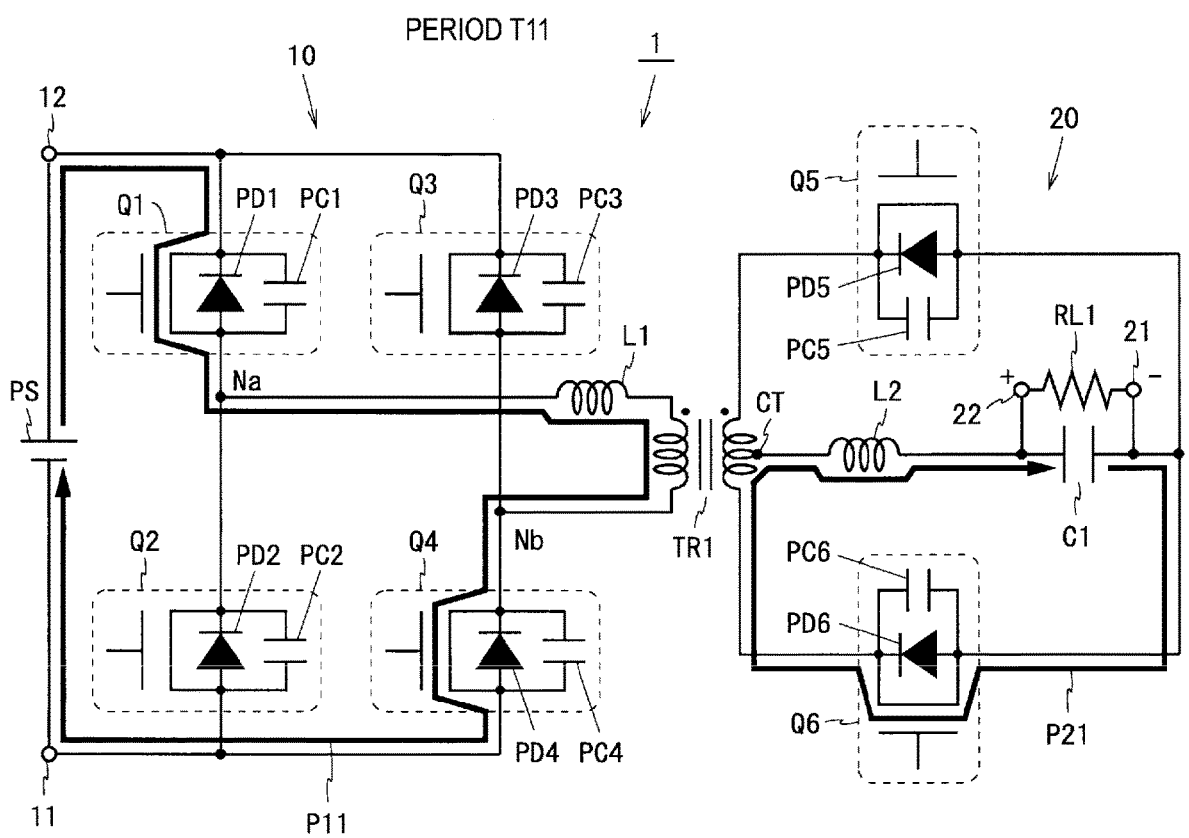
FIG. 4 is a current path diagram of a period T11 of the power supply illustrated in FIG. 1.

FIG. 4 is a current path diagram of the period T11. In the period T11, the MOSFETs Q1, Q4, Q6 are in an on state, and the MOSFETs Q2, Q3, Q5 are in an off state. In the primary circuit 10, the current flows through a path P11 passing sequentially through the second input terminal 12, the MOSFET Q1, the coil L1, the primary winding of the transformer TR1, the MOSFET Q4, and the first input terminal 11. The current I11 increases over time, and the power is stored in the coil L1. In the secondary circuit 20, voltage is induced in the secondary winding of the transformer TR1. The current flows through a path P21 sequentially passing through the center tap CT, the coil L2, the capacitor C1, the MOSFET Q6, and the second end of the secondary winding of the transformer TR1. At this time, the capacitor C1 is charged. In the period T11, power is transmitted from the primary circuit 10 to the secondary circuit 20.

At the start of the period T12, the MOSFET Q4 is turned off. In the period T12, the MOSFETs Q1, Q6 are in an on state, and the MOSFETs Q2 to Q5 are in an off state. Since the MOSFET Q4 includes the parasitic capacitor PC4, the source-drain voltage of the MOSFET Q4 hardly rises when the MOSFET Q4 is turned off. Thus, the off operation of the MOSFET Q4 corresponds to zero voltage switching.

Figure 5:
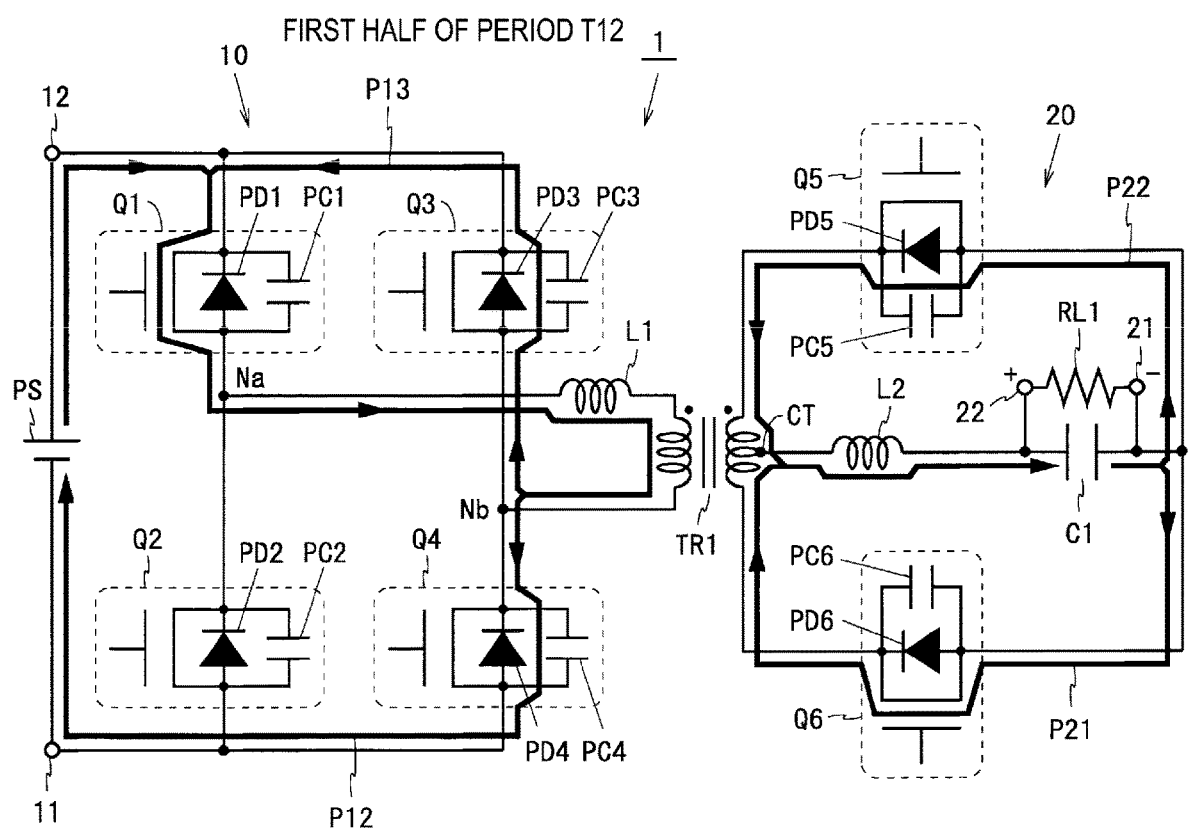
FIG. 5 is a current path diagram of a first half of a period T12 of the power supply illustrated in FIG. 1.

The current path in the primary circuit 10 changes in the middle of the period T12. Hereinafter, the period until the current path changes is referred to as a first half of the period T12, and the subsequent period is referred to as a second half of the period T12. FIG. 5 is a current path diagram of the first half of the period T12. In the primary circuit 10, the current flows through a path P12 passing sequentially through the second input terminal 12, the MOSFET Q1, the coil L1, the primary winding of the transformer TR1, the parasitic capacitor PC4, and the first input terminal 11; and a path P13 flowing through the parasitic capacitor PC3 after the primary winding of the transformer TR1. At this time, the parasitic capacitor PC3 is discharged, and the parasitic capacitor PC4 is charged. Thus, the potential of the node Nb rises, the potential difference (Va−Vb) between the nodes Na, Nb decreases, and the current I1 decreases. In the secondary circuit 20, the current continues to flow through the path P21 described above. Further, because the electromotive force of the secondary winding of the transformer TR1 is reduced, the parasitic capacitor PC5 is discharged. Thus, the current also flows through a path P22 sequentially passing through the center tap CT, the coil L2, the capacitor C1, the parasitic capacitor PC5, and the first end of the secondary winding of the transformer TR1.

Figure 6:
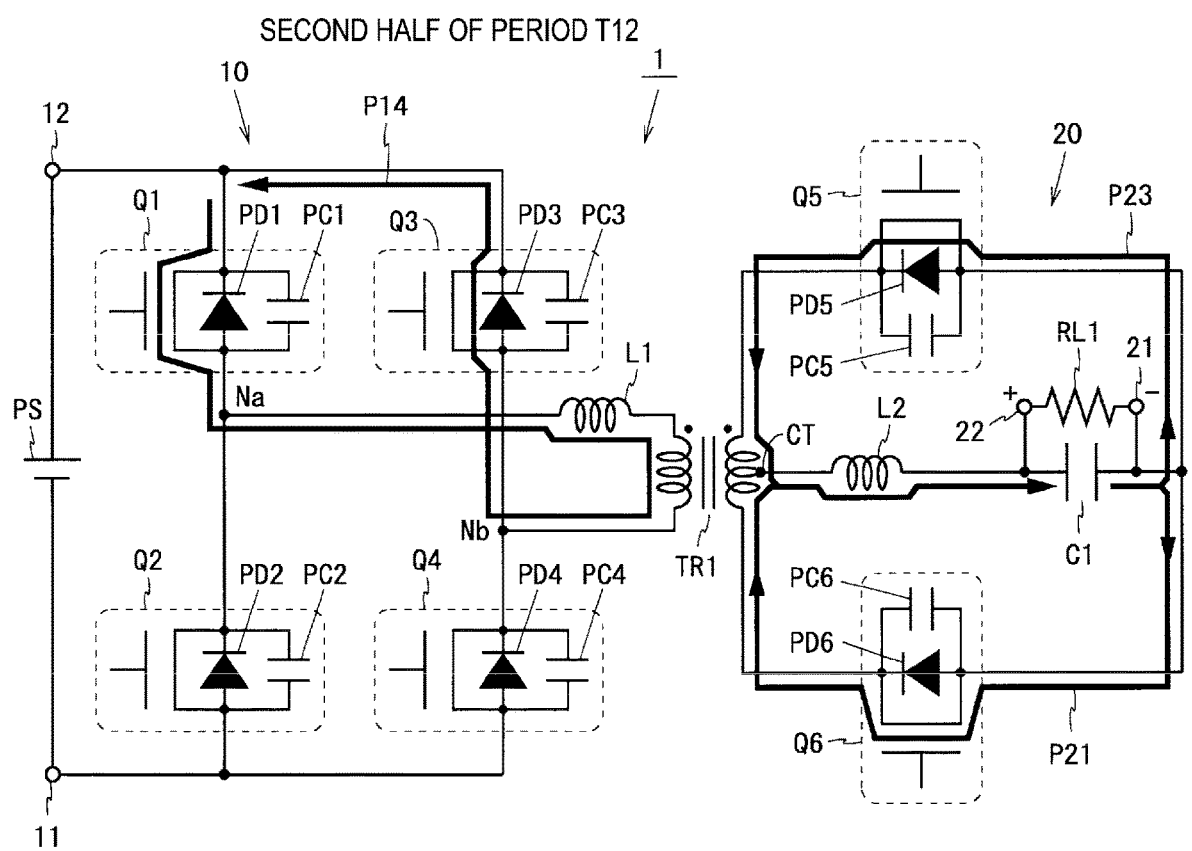
FIG. 6 is a current path diagram of a second half of the period T12 of the power supply illustrated in FIG. 1.

When the discharging of the parasitic capacitor PC3 and the charging of the parasitic capacitor PC4 are completed, the second half of the period T12 begins. FIG. 6 is a current path diagram of the second half of the period T12. In the primary circuit 10, the potential difference (Va−Vb) between the nodes Na, Nb is substantially zero. The current returns through a path P14 sequentially passing through the MOSFET Q1, the coil L1, the primary winding of the transformer TR1, and the parasitic diode PD3. At this time, the current I1 is substantially constant. In the secondary circuit 20, the current continues to flow through the path P21 described above and also flows through a path P23 sequentially passing through the center tap CT, the coil L2, the capacitor C1, the parasitic diode PD5, and the first end of the secondary winding of the transformer TR1. The currents I2a, I2b are both reduced by the action of the voltage across the capacitor C1.

The MOSFET Q3 is turned on at the start of the period T13, and the MOSFET Q5 is turned on in the middle of the period T13. Hereinafter, the period until the MOSFET Q5 is turned on is referred to as a first half of the period T13, and the subsequent period is referred to as a second half of the period T13. In the period T13, the MOSFETs Q1, Q3, Q6 are in an on state, and the MOSFETs Q2, Q4 are in an off state. The MOSFET Q5 is in an off state in the first half of the period T13 and an on state in the second half of the period T13. The MOSFET Q3 is turned on while the forward current flows to the parasitic diode PD3. Thus, the on operation of the MOSFET Q3 corresponds to zero voltage switching.

Figure 7:
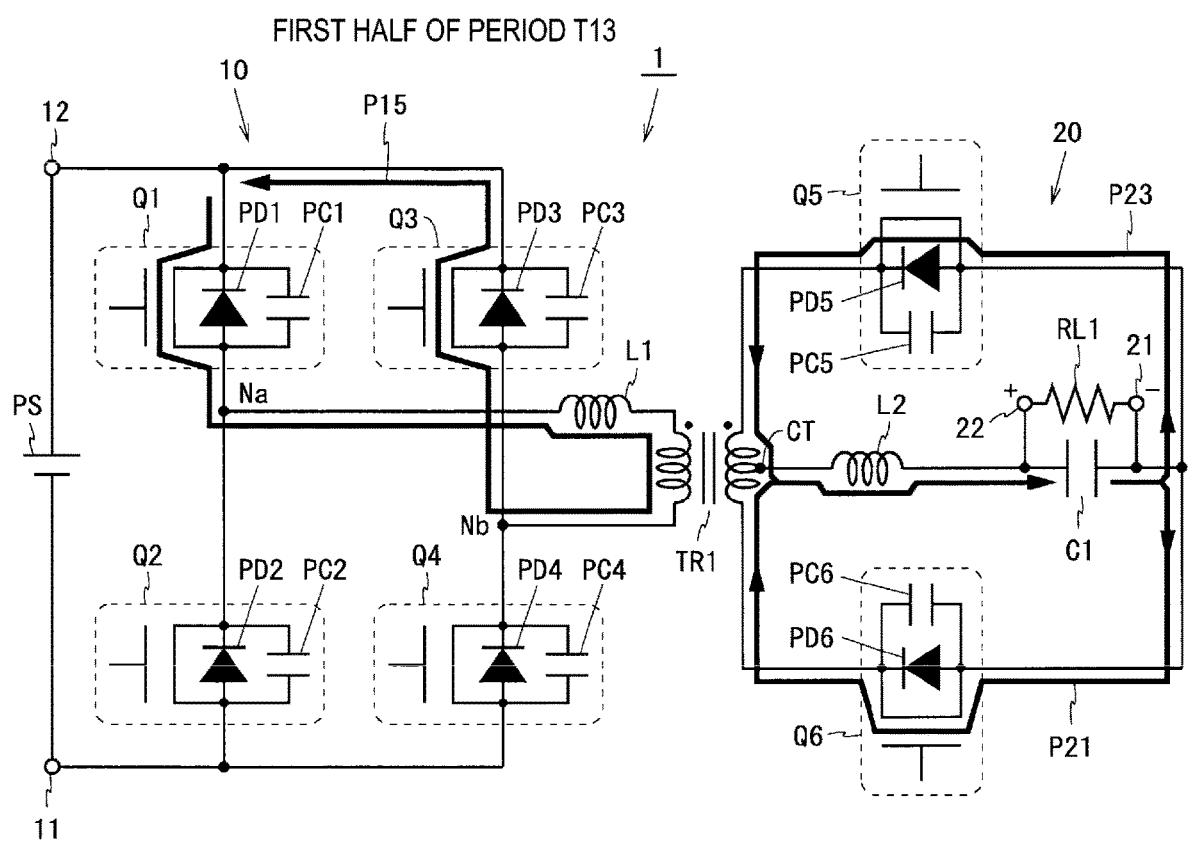
FIG. 7 is a current path diagram of a first half of a period T13 of the power supply illustrated in FIG. 1.

FIG. 7 is a current path diagram of the first half of the period T13. In the primary circuit 10, the current returns through a path P15 passing sequentially through the MOSFET Q1, the coil L1, the primary winding of the transformer TR1, and the MOSFET Q3. At this time, the current I1 is substantially constant. In the secondary circuit 20, the current continues to flow through the paths P21, P23 described above. The currents I2a, I2b are both continually reduced by the action of the voltage across the capacitor C1.

Figure 8:
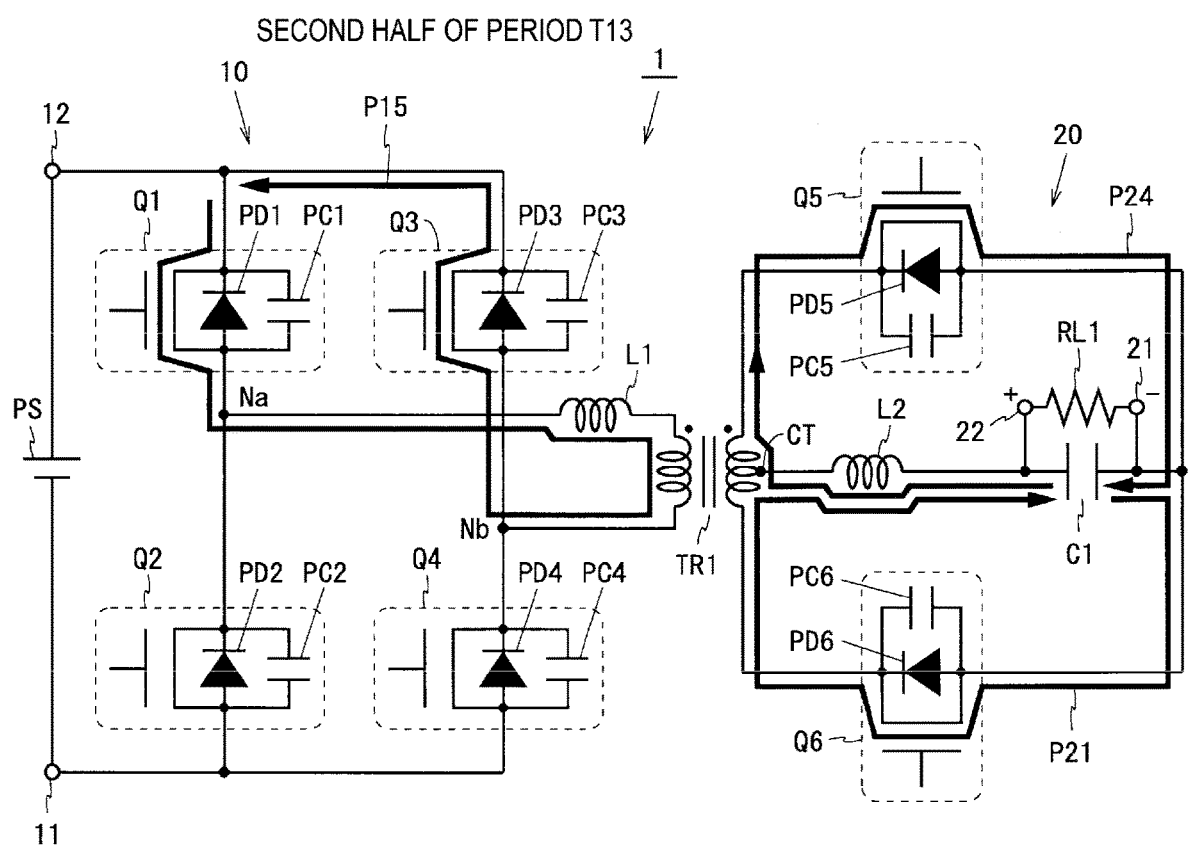
FIG. 8 is a current path diagram of a second half of the period T13 of the power supply illustrated in FIG. 1.

Before the current I2a becomes 0, the MOSFET Q5 is turned on, and the second half of the period T13 begins. FIG. 8 is a current path diagram of the second half of the period T13. In the primary circuit 10, the current continues to return through the path P15 described above. At this time, the current I1 is substantially constant. In the secondary circuit 20, soon after the MOSFET Q5 is turned on, the current I2a becomes negative (the orientation of the current I2a is reversed). At this time, the current flows through the path P21 described above; and a path P24 sequentially passing through the first end of the secondary winding of the transformer TR1, the MOSFET Q5, the capacitor C1, the coil L2, and the center tap CT. The current I2, which is the sum of the currents I2a, I2b, is positive in the first half of the period T13 and negative in the second half of the period T13. The capacitor C1 is charged in the first half of the period T13, and the capacitor C1 is discharged in the second half of the period T13. Eventually, the current I2b also becomes negative (the orientation of the current I2b is reversed).

The MOSFET Q1 is turned off at the start of the period T14, and the MOSFET Q6 is turned off in the middle of the period T14. In the period T14, the MOSFETs Q3, Q5 are in an on state, and the MOSFETs Q1, Q2, Q4 are in an off state. The MOSFET Q6 is in an on state until the middle of the period and subsequently in an off state. Since the MOSFET Q1 includes the parasitic capacitor PC1, the source-drain voltage of the MOSFET Q1 hardly rises when the MOSFET Q1 is turned off. Thus, the off operation of the MOSFET Q1 corresponds to zero voltage switching. As illustrated in FIG. 3, the period T14 is divided into a period T141 until the MOSFET Q6 starts the off operation, a period T142 until the current flowing through the MOSFET Q6 becomes 0, and a subsequent period T143.

Figure 9:
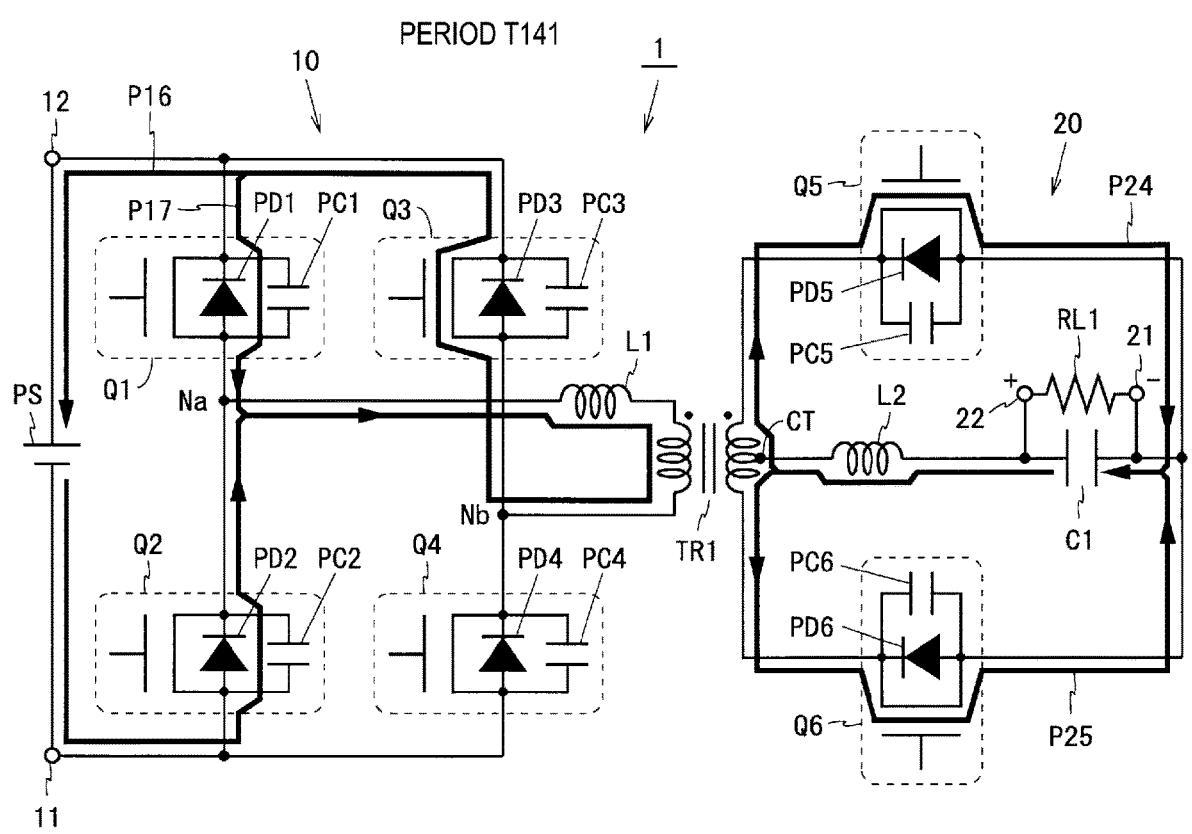
FIG. 9 is a current path diagram of a period T141 of the power supply illustrated in FIG. 1.

FIG. 9 is a current path diagram of the period T141. In the primary circuit 10, the current flows through a path P16 passing sequentially through the first input terminal 11, the parasitic capacitor PC2, the coil L1, the primary winding of the transformer TR1, the MOSFET Q3, and the secondary input terminal 12; and through a path P17 passing through the parasitic capacitor PC1 after the MOSFET Q3. At this time, the parasitic capacitor PC1 is charged, and the parasitic capacitor PC2 is discharged. Thus, the potential (and the voltage VQ2SD) of the node Na is reduced. In the period T141, the current flows toward the second input terminal 12, which is a positive input terminal. To make the current flow, the power stored in the coil L1 is used. Thus, the current I1 rapidly decreases and eventually becomes zero. In the secondary circuit 20, the current flows through the path P24 described above, and a path P25 sequentially passing through the second end of the secondary winding of the transformer TR2, the MOSFET Q6, the capacitor C1, the coil L2, and the center tap CT. In the period T141, the current I1 decreases, and thus the current I2a increases and the current I2b decreases. The current I2 continues to decrease.

In a case that the output power of the power supply 1 is relatively large (that is, in a case that the load RL1 is heavy), the current I1 during the period T13 is large, and the power stored in the coil L1 is also large. Thus, in the period T14, the voltage VQ2SD becomes zero before the current I1 becomes 0. Thus, the off operation of the MOSFET Q2 corresponds to zero voltage switching. On the other hand, in a case that the output power is relatively small, the voltage VQ2SD has not yet reached zero when the current I1 becomes zero. Thus, without special ingenuity, the off operation of the MOSFET Q2 does not correspond to zero voltage switching. In the power supply 1, to make the off operation of the MOSFET Q2 correspond to zero voltage switching, the MOSFET Q6 is turned off at the start of the period T142.

Figure 10:
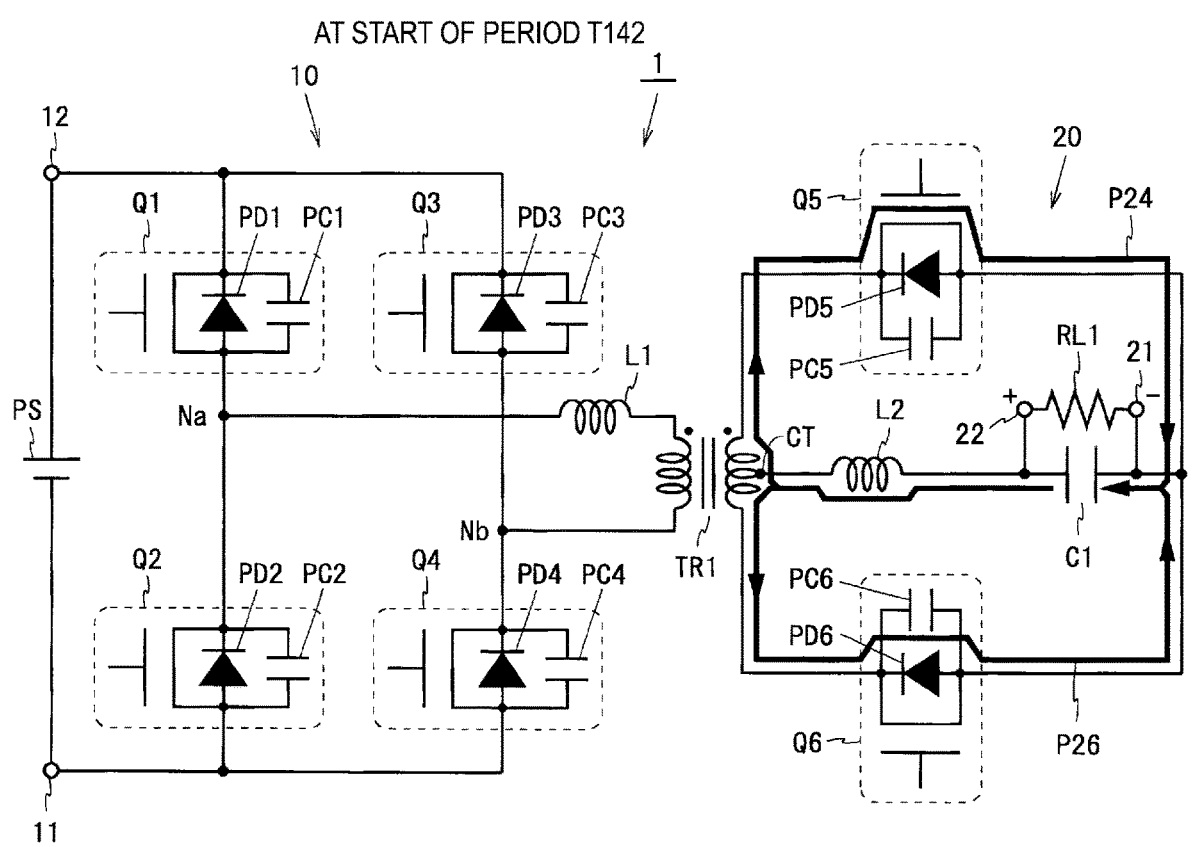
FIG. 10 is a current path diagram of a start of a period T142 of the power supply illustrated in FIG. 1.

FIG. 10 is a current path diagram of the start of the period T142 (the moment the MOSFET Q6 is turned off). At this time, current does not flow in the primary circuit 10. In the secondary circuit 20, the current flows through the path P24 described above; and a path P26 sequentially passing through the second end of the secondary winding of the transformer TR1, the parasitic capacitor PC6, the capacitor C1, the coil L2, and the center tap CT. At this time, the parasitic capacitor PC6 is charged. In the period T142, as the charging of the parasitic capacitor PC6 progresses, the current I2b increases closer to zero while the current I2a decreases. Thus, the current flowing through the secondary winding of the transformer TR1 flows substantially from the second end toward the first end of the secondary winding (from a lower end toward an upper end in the drawing). This induces a voltage in the primary winding of the transformer TR1, and the current I1 increases once again.

Figure 11:
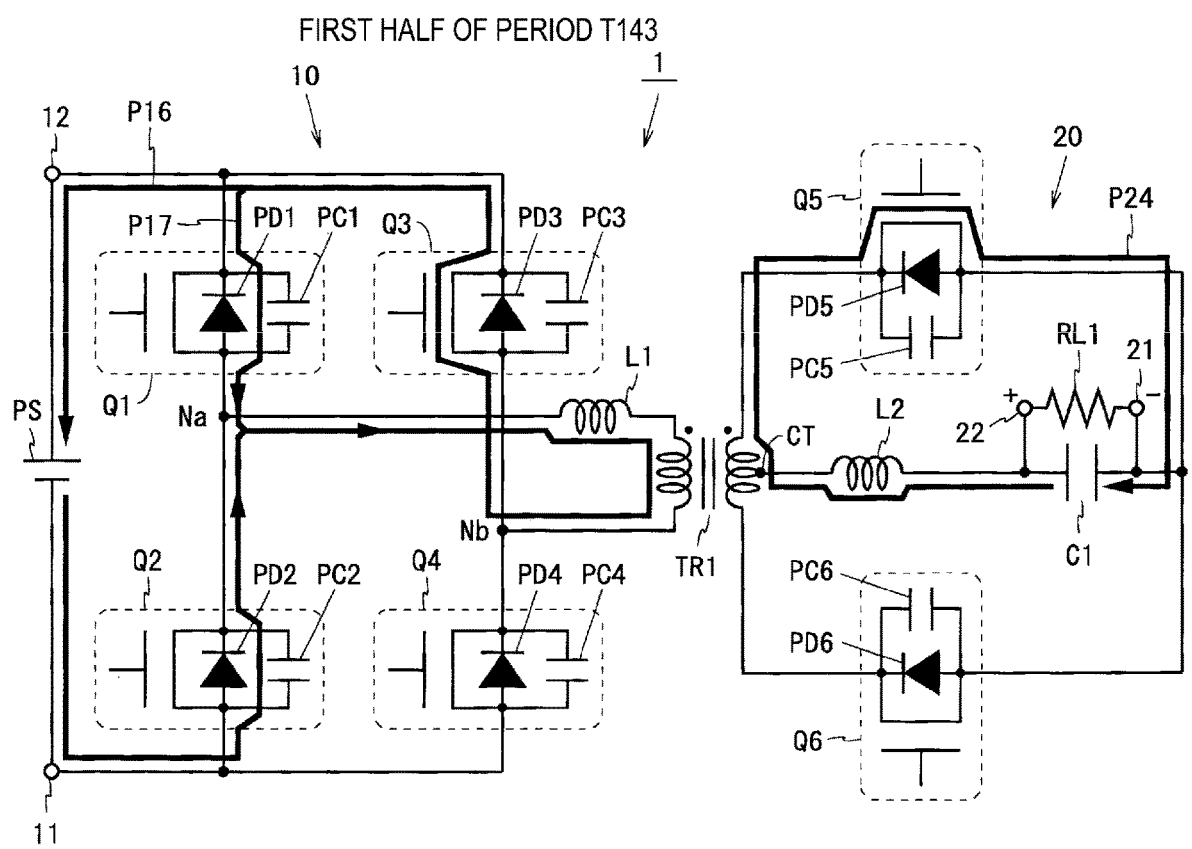
FIG. 11 is a current path diagram of a first half of a period T143 of the power supply illustrated in FIG. 1.

The current path in the primary circuit 10 changes in the middle of the period T143. Hereinafter, the period until the current path changes is referred to as a first half of the period T143, and the subsequent period is referred to as a second half of the period T143. FIG. 11 is a current path diagram of the first half of the period T143. In the primary circuit 10, the current flows once again through the same paths as those in the period T141 (paths P16, P17 described above). As a result, the charging of the parasitic capacitor PC1 and the discharging of the parasitic capacitor PC2 are resumed. Thus, the potential of the node Na (and the voltage VQ2SD) is reduced once again. In the secondary circuit 20, the current flows through the path P24 described above.

Figure 12:
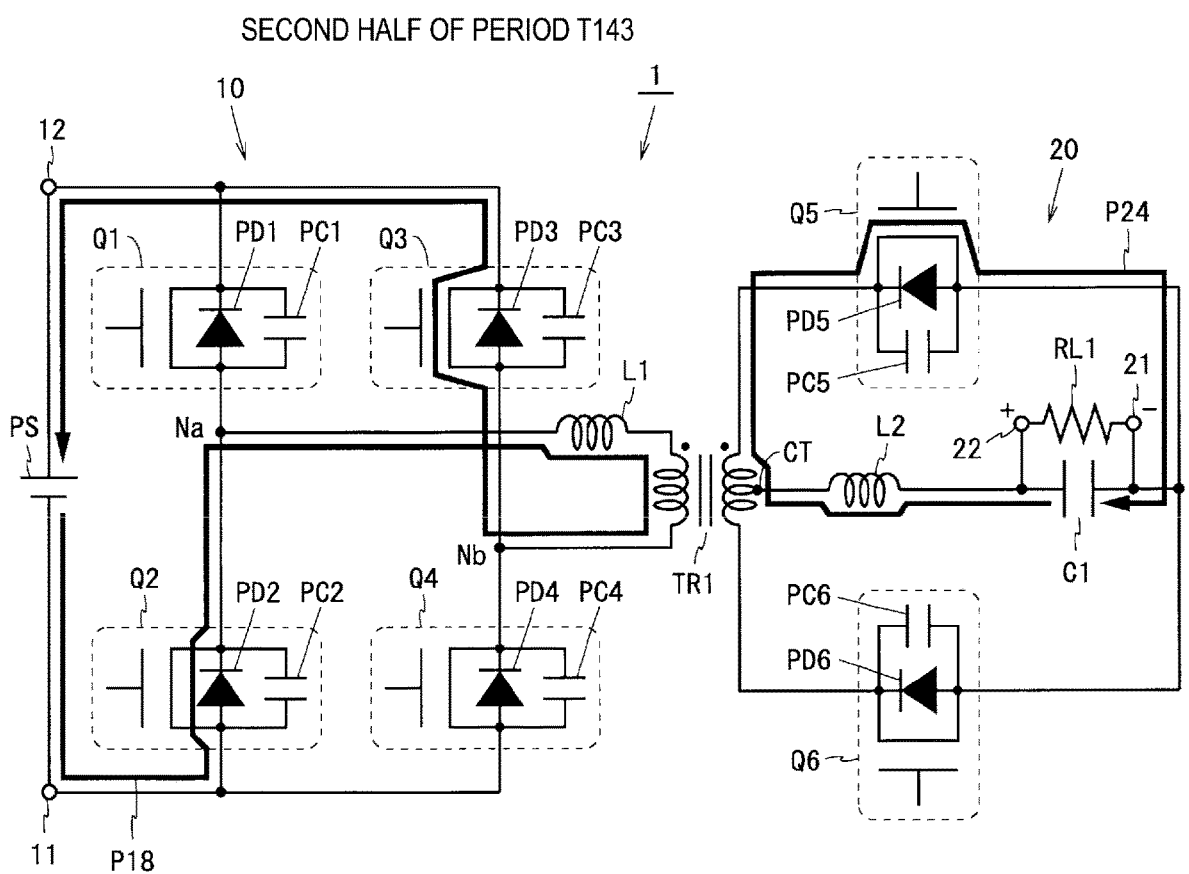
FIG. 12 is a current path diagram of a second half of the period T143 of the power supply illustrated in FIG. 1.

When the voltage VQ2SD becomes substantially zero, the second half of the period T143 begins. FIG. 12 is a current path diagram of the second half of the period T143. In the primary circuit 10, the current flows through a path P18 passing sequentially through the first input terminal 11, the parasitic diode PD2, the coil L1, the primary winding of the transformer TR1, the MOSFET Q3, and the second input terminal 12. In the secondary circuit 20, the current continues to flow through the path P24 described above.

In this way, in the period T14, the capacitor C1 is discharged. Further, in the secondary circuit 20, the discharge current of the capacitor C1 flows substantially from the second end toward the first end of the secondary winding of the transformer TR1, inducing voltage in the primary winding of the transformer TR1. As a result, in the primary circuit 10, the current I1 flows in a direction that sets the source-drain voltage of the MOSFET Q2 to zero.

At the start of the period T15, the MOSFET Q2 is turned on. At the start of the period T15, the voltage VQ2SD is substantially zero, and a forward current is flowing to the parasitic diode PD2. Thus, the on operation of the MOSFET Q2 corresponds to zero voltage switching. Note that in a case that the MOSFET Q6 is not turned off in the middle of the period T14 (that is, in a case that substantially no current flows from the second end to the first end of the secondary winding of the transformer TR1), the voltage VQ2SD and the current I1 change as indicated by the dot-dash lines W1 and W2 in FIG. 3, respectively. The off operation of the MOSFET Q2 in this state does not correspond to zero voltage switching.

Figure 13:
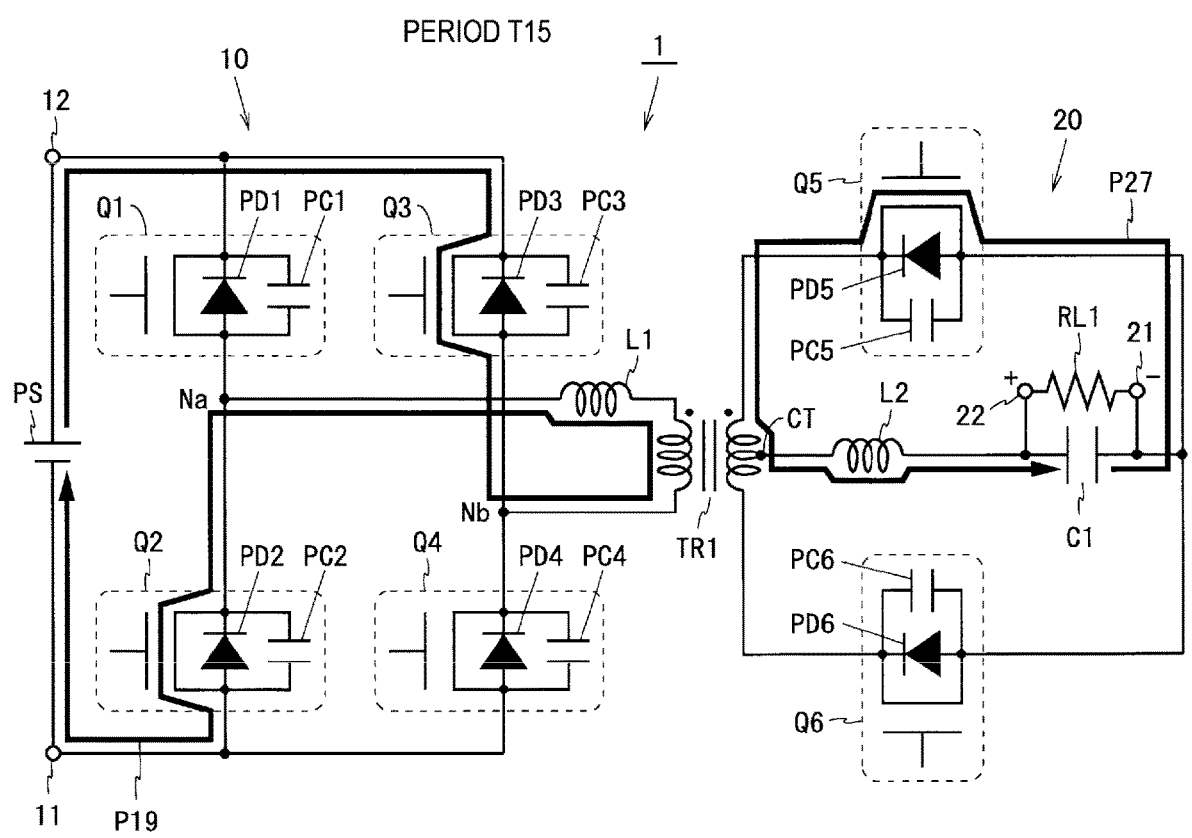
FIG. 13 is a current path diagram of a period T15 of the power supply illustrated in FIG. 1.

FIG. 13 is a current path diagram of the period T15. In the period T15, the MOSFETs Q2, Q3, Q5 are in an on state, and the MOSFETs Q1, Q4, Q6 are in an off state. In the primary circuit 10, the current flows through a path P19 passing sequentially through the second input terminal 12, the MOSFET Q3, the primary winding of the transformer TR1, the coil L1, the MOSFET Q2, and the first input terminal 11. In the secondary circuit 20, voltage is induced in the secondary winding of the transformer TR1. The current flows through a path P27 sequentially passing through the center tap CT, the coil L2, the capacitor C1, the MOSFET Q5, and the first end of the secondary winding of the transformer TR1. At this time, the capacitor C1 is charged. In the period T15, compared to the period T11, the orientation of the current flowing through the primary winding of transformer TR1 is reversed, and the orientation of the current flowing through the secondary winding of transformer TR1 is also reversed.

In the periods T15 to T18, the power supply 1 operates symmetrically with the periods T11 to T14. Specifically, the operation of the MOSFETs Q1 to Q6 in the periods T15 to T18 is the same as the operation of the MOSFETs Q3, Q4, Q1, Q2, Q6, Q5 in the periods T11 to T14, respectively. The changes in the currents I2a, I2b in the periods T15 to T18 are the same as the changes in the currents I2b, I2a in the periods T11 to T14. The changes in the current I1 in the periods T15 to T18 are opposite to the changes in the current I1 in the periods T11 to T14 (absolute values are the same; positive and negative values are reversed).

In the power supply 1, before the MOSFET Q2 is turned on, the capacitor C1 starts discharging. In the period T141, the current flows through the path P24 passing through the coil L2, the center tap CT, and the MOSFET Q5; and the path P25 passing through the coil L2, the center tap CT, and the MOSFET Q6, from a positive electrode terminal (terminal on the left side in the drawing) toward a negative electrode terminal (terminal on the right side in the drawing) of the capacitor C1 (refer to FIG. 9). When the MOSFET Q6 is turned off at the start of the period T142, the current I2a flowing through the path P24 decreases and the current I2b flowing through the path P25 becomes zero (refer to FIG. 3). As a result, the current flows substantially from the second end to the first end of the secondary winding of the transformer TR1, voltage is induced in the primary winding of the transformer TR1, and the current I1 flows. The flow of the current I1 reduces the voltage VQ2SD.

A switching loss can be reduced by turning the MOSFET Q2 on after the voltage VQ2SD is reduced. In particular, the switching loss can be reduced by turning the MOSFET Q2 on after the voltage VQ2SD is reduced to substantially 0. Thus, in the power supply 1, the power stored in the capacitor C1 of the secondary circuit 20 is transmitted to the primary circuit 10 and, after the source-drain voltage of the MOSFET Q2 is reduced, the MOSFET Q2 is turned on. As a result, the switching loss can be reduced at the on operation of the MOSFET Q2. In the power supply 1, using this same method, the switching loss at the on operation of the MOSFETs Q1, Q3, Q4 is reduced.

Preferred conditions for a current flowing substantially from the second end toward the first end of the secondary winding of the transformer TR1 will now be described. The stored energy (Eoss) of each output capacity (Coss) of the MOSFETs Q1, Q2 are denoted as E1, E2, respectively, and the total energy of the current substantially flowing from the second end toward the first end of the secondary winding of the transformer TR1 is denoted as E3. The output capacity is the sum of a drain-to-source capacity Cds and a gate-to-drain capacity Cgd. The stored energies E1, E2 of the output capacities are each found by integrating the output capacity with voltage and indicate the energy of the output capacity. The total energy E3 is found by integrating the product of the current and the voltage across the secondary winding of the transformer TR1 in the period from when the current begins to substantially flow from the second end toward the first end of the secondary winding of the transformer TR1 until the MOSFET Q2 is turned on.

The total energy E3 preferably satisfies the following relationship (1):

$$0.1 \times (E1+E2) < E3 < 10 \times (E1+E2) \qquad (1)$$

In a case that the total energy E3 is less than a lower limit of relationship (1), the source-drain voltage of the MOSFET Q2 cannot be sufficiently reduced. On the other hand, in a case that the total energy E3 is greater than an upper limit value of relationship (1), the conduction loss in a case that the current flows through the paths P18, P24 in the second half of the period T143 (FIG. 12) increases, greatly impairing the effect of a reduction in loss resulting from making the off operation of the MOSFET Q2 correspond to zero voltage switching.

Further, preferred conditions will now be described for performing the series of operations from discharging the capacitor C1 to reducing the voltage VQ2SD. The DC/DC converter may operate in a mode in which the output voltage is gradually increased for circuit protection at startup (soft start). Further, the output voltage of the DC/DC converter may vary within a certain range. In a case that the output voltage is significantly low at such a time, the power accumulated in the capacitor C becomes small. As a result, the time required for the series of operations described above significantly lengthens, possibly lengthening one cycle of the operation of the power supply 1. Preferably, therefore, the series of operations described above is performed only when the output voltage is greater than 50% of the rated value, for example. Note that the two types of preferred conditions described above are applied not only to the present embodiment, but also to the embodiments described below.

The power supply 1 according to the present embodiment includes the transformer TR1, the switching circuit (the primary circuit 10) connected to the primary winding of the transformer TR1, and the rectifier circuit (the secondary circuit 20) connected to the secondary winding of the transformer TR1. The switching circuit includes the switching elements (MOSFETs Q1 to Q4) provided with the first conduction electrode and the second conduction electrode (a source electrode and a drain electrode) and switchable between the on state and the off state, and the rectifier circuit includes the rectifier elements (MOSFETS Q5, Q6) that rectify power transmitted from the primary side of the transformer TR1 and includes the capacitor C1 that stores the rectified power. The rectifier circuit performs a discharge operation of discharging the capacitor C1 and causing a current to flow into the secondary winding of the transformer TR1 to reduce the voltage (source-drain voltage) between the first conduction electrode and the second conduction electrode of the switching element before the switching element is switched from the off state to the on state.

Thus, according to the power supply 1 according to the present embodiment, the capacitor C1 included in the rectifier circuit is discharged, causing a current to flow into the secondary winding of the transformer TR1, and the power stored in the capacitor C1 is transmitted to the switching circuit via the transformer TR1, reducing the voltage between the conduction electrodes of the switching element included in the switching circuit even during low output. After the voltage between the conduction electrodes is reduced, the switching element is switched to the on state, making it possible to reduce the switching loss in the switching element even during low output. In particular, after the voltage between the conduction electrodes is reduced to substantially zero, the switching element is switched to the on state, making it possible to perform zero voltage switching and reduce the switching loss even during low output. Thus, it is possible to provide a power supply that has high power-conversion efficiency even during low output and is highly efficient across a wide output range from low output to high output.

Further, the rectifier circuit includes a first switching element and a second switching element (the MOSFETs Q5, Q6) as the rectifier element and the coil L2, and the secondary winding of the transformer TR1 includes the center tap CT. The first end (right end in the drawing) of the capacitor C1 is connected to the first end (upper end in the drawing) of the secondary winding with the first switching element (MOSFET Q5) therebetween and is connected to the second end (lower end in the drawing) of the secondary winding with the second switching element (MOSFET Q6) therebetween, and the second end (left end in the drawing) of the capacitor C1 is connected to the center tap CT with the coil L2 therebetween. The rectifier circuit performs, as the discharge operation, an operation of making a current flow into the path P24 passing through the coil L2, the center tap CT, the first end of the secondary winding, and the first switching element; and the path P25 passing through the coil L2, the center tap CT, the second end of the secondary winding, and the second switching element to start discharge of the capacitor C1; and an operation of subsequently turning off the second switching element.

Thus, in the rectifier circuit having the configuration described above, a current is made to flow through the two paths P24, P25 to start discharge of the capacitor C1, and subsequently the second switching element is turned off, making it possible to cause a current to flow into the secondary winding of the transformer TR1 and to reduce the voltage between the conduction electrodes of the switching elements included in the switching circuit even during low output. Accordingly, it is possible to reduce the switching loss in the switching elements and increase the power conversion efficiency even during low output.

Further, the switching circuit is a full-bridge circuit. Accordingly, it is possible to provide a power supply that includes a full-bridge circuit as the switching circuit and has a high power-conversion efficiency even during low output.

Figure 14:
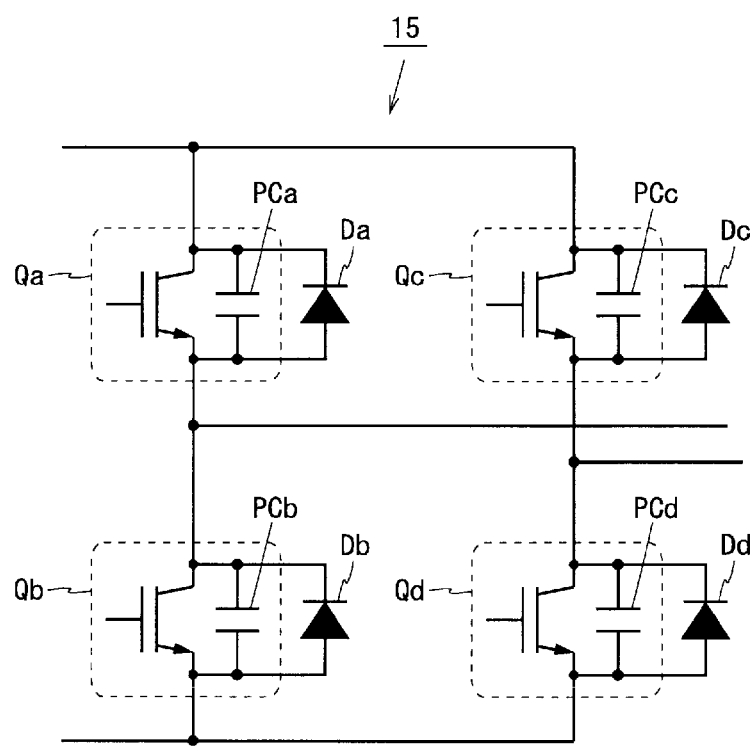
FIG. 14 is a circuit diagram of a primary circuit of a power supply according to a modified example of the first embodiment.

The power supply 1 according to the present embodiment can constitute the following modified example. FIG. 14 is a circuit diagram of a primary circuit of a power supply according to a modified example of the present embodiment. A primary circuit 15 illustrated in FIG. 14 is a full-bridge circuit including four Insulated Gate Bipolar Transistors (IGBTs) Qa to Qd. The IGBTs Qa to Qd are negative-positive-negative (NPN) type IGBTs, respectively including parasitic capacitors PCa to PCd. Diodes Da to Dd are respectively connected in parallel to the IGBTs Qa to Qd.

In general, in a case that a switching circuit configured using a MOSFET is configured using a bipolar transistor, the source electrode and the drain electrode of the MOSFET may be replaced with an emitter electrode and a collector electrode of a bipolar transistor, respectively. The primary circuit 15 is obtained by performing the replacement described above for the primary circuit 10 illustrated in FIG. 1. The IGBTs Qa to Qd respectively perform the same operations as those of the MOSFETs Q1 to Q4 included in the primary circuit 10.

The power supply including the full-bridge circuit configured by using the IGBTs also has the same effect as that of the power supply including the full-bridge circuit configured by using the MOSFETs. Note that, although an NPN-type IGBT is used here, a positive-negative-positive (PNP) type IGBT may be used. Further, the MOSFET included in the secondary circuit may be replaced with a circuit in which the IGBT and the diode are connected with each other in parallel. In addition, a bipolar transistor, a silicon carbide (SiC)—MOSFET, a gallium nitride (GaN)—MOSFET, or the like may be used in place of the IGBT.

Second Embodiment

Figure 15:
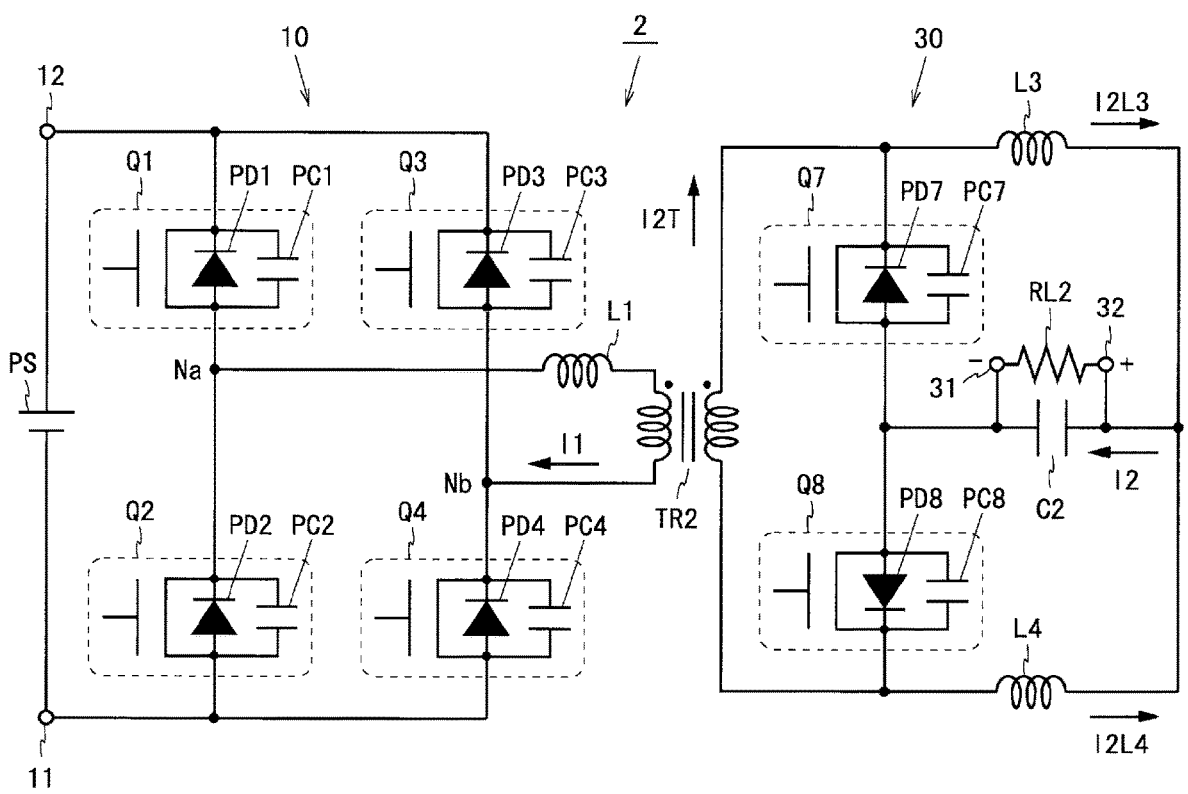
FIG. 15 is a circuit diagram of a power supply according to a second embodiment.

FIG. 15 is a circuit diagram of a power supply according to a second embodiment. A power supply 2 illustrated in FIG. 15 is a DC/DC converter including N-channel type MOSFETs Q1 to Q4, Q7, Q8, a transformer TR2, coils L1, L3, L4, and a capacitor C2. The power supply 2 includes the primary circuit 10 on the primary side of the transformer TR2 and a secondary circuit 30 on the secondary side of the transformer TR2. The configuration and operation of the primary circuit 10 are the same as those of the first embodiment. Among the constituent elements of the power supply according to the present embodiment, constituent elements that are the same as those of the first embodiment are denoted by the same reference numerals, and descriptions thereof will be omitted.

The MOSFETs Q7, Q8 are switching elements similar to the MOSFETs Q1 to Q6. The secondary circuit 30 includes the MOSFETs Q7, Q8, the coils L3, L4, and the capacitor C2. The secondary circuit 30 includes a first output terminal 31 as a negative output terminal and a second output terminal 32 as a positive output terminal. The capacitor C2 is connected between the first and second output terminals 31, 32. The source electrodes of the MOSFETs Q7, Q8 are both connected to the first output terminal 31. The drain electrode of the MOSFET Q7 is connected to a first end (upper end in the drawing) of the secondary winding of the transformer TR2 and is connected to a first end (left end in the drawing) of the coil L3. The drain electrode of the MOSFET Q8 is connected to a second end of the secondary winding of the transformer TR2 and is connected to a first end (left end in the drawing) of the coil L4. The second ends of the coils L3, L4 are both connected to the second output terminal 32.

The secondary circuit 30 is thus a rectifier circuit connected to the secondary winding of the transformer TR2. This rectifier circuit is a current doubler type of full wave rectifier circuit. In the secondary circuit 30, a first end (left end in the drawing) of the capacitor C2 is connected to the first end of the secondary winding of the transformer TR2 with the MOSFET Q7 therebetween and is connected to the second end of the secondary winding of the transformer TR2 with the MOSFET Q8 therebetween. The second end of the capacitor C2 is connected to the first end of the secondary winding of the transformer TR2 with the coil L3 therebetween and is connected to the second end of the secondary winding of the transformer TR2 with the coil L4 therebetween. Both the MOSFETs Q7, Q8 are rectifier elements that rectify the power transmitted from the primary side of the transformer TR2, and the capacitor C2 stores the rectified power.

For the coils L3, L4, a coil having an inductance of from 10 to 100 µH, for example, is used. For the capacitor C2, a capacitor having a capacitance of from 20 to 1,000 µF, for example, is used. The inductance of the coils L3, L4 and the capacitance of the capacitor C2 may be values outside the ranges described above.

The primary circuit 10 operates in the same manner as in the first embodiment. The transformer TR2 transforms the alternating current supplied to the primary winding and outputs the alternating current from the secondary winding. In the secondary circuit 30, the transformed alternating current output from the secondary winding of the transformer TR2 is rectified to charge the capacitor C2. In this way, the power supply 2 converts the voltage level of the power supplied from the direct current power supply PS and supplies the power in the converted voltage to a load RL2.

Figure 16:
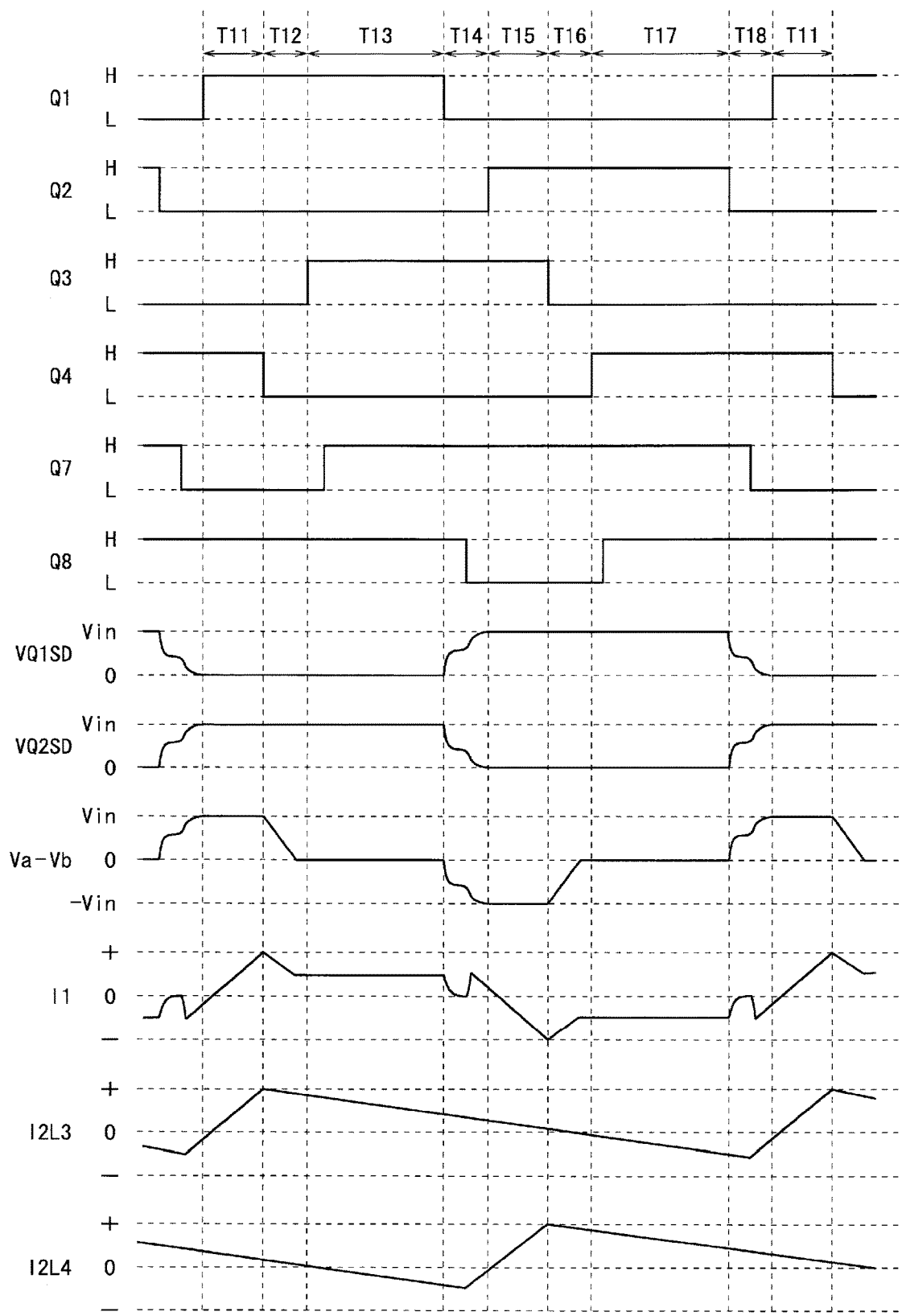
FIG. 16 is a timing chart of the power supply illustrated in FIG. 15.

The operation of the power supply 2 in a case that the output power is relatively small will now be described with reference to FIG. 16 to FIG. 24. FIG. 16 is a timing chart of the power supply 2 in a case that the output power is relatively small. FIG. 16 illustrates changes in the gate potential of the MOSFETs Q1 to Q4, Q7, Q8, the source-drain voltage VQ1SD of the MOSFET Q1, the source-drain voltage VQ2SD of the MOSFET Q2, the potential difference (Va−Vb) between the nodes Na, Nb, the current I11 flowing through the primary winding of the transformer TR1, a current I2L3 flowing through the coil L3, and a current I2L4 flowing through the coil L4. One cycle of operation of the power supply 2 is divided into the eight periods T11 to T18.

Figure 17:
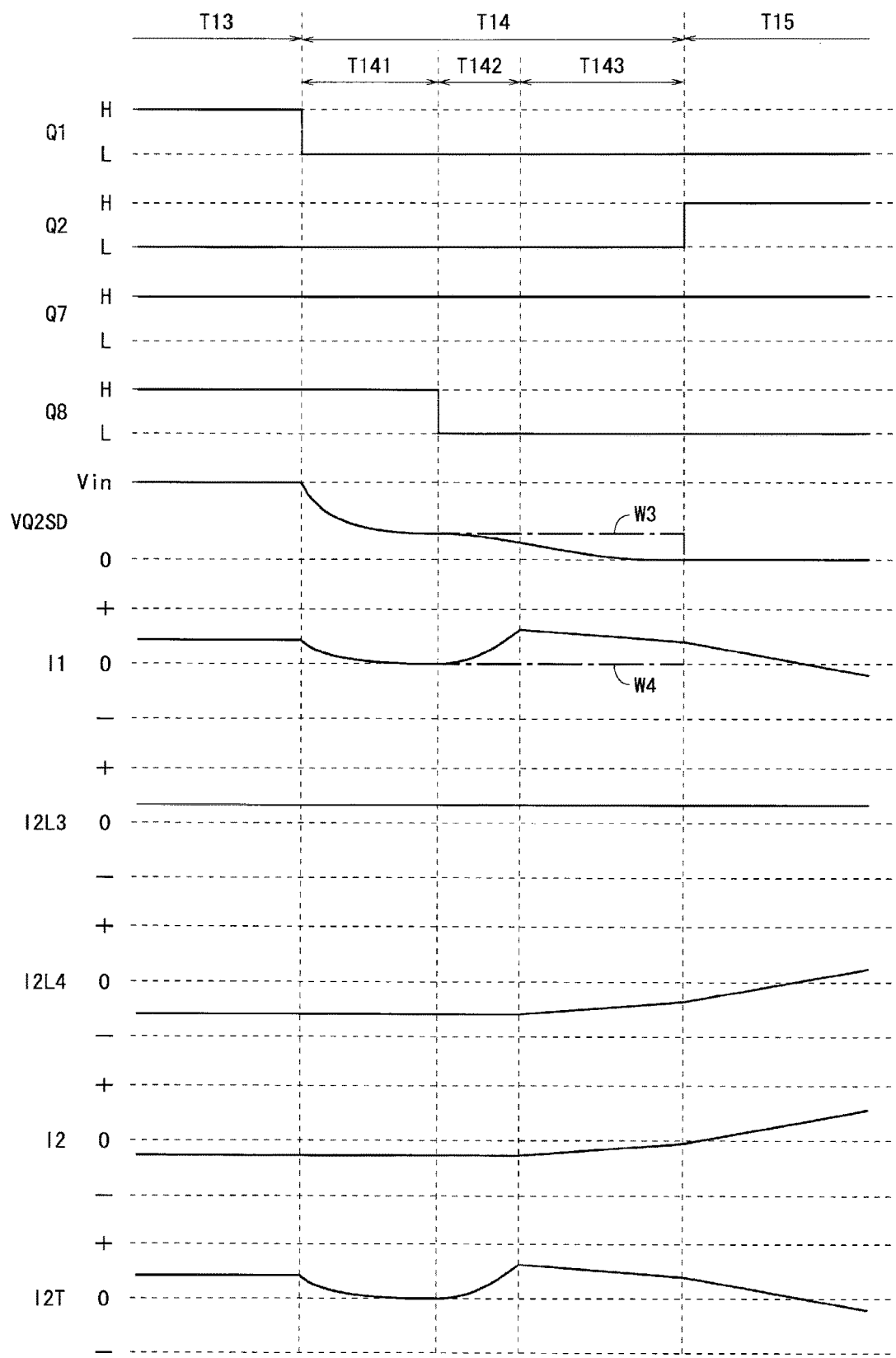
FIG. 17 is a diagram illustrating a portion of the timing chart illustrated in FIG. 16 in detail.

FIG. 17 is a diagram illustrating a portion of the timing chart illustrated in FIG. 16 in detail. In FIG. 17, the entire period T14 and portions of the periods T13, T15 are illustrated in an enlarged view. FIG. 17 illustrates the change in the currents I2, I2T in place of the changes in the gate potential of the MOSFETs Q3, Q4, the voltage VQ1SD, and the potential difference (Va−Vb). The current I2 is the sum of the currents I2L3, I2L4 (I2=I2L3+I2L4), and the current I2T is the current flowing through the secondary winding of the transformer TR2. In a case that the current flowing through the load RL2 is negligible, the current I2 is equal to the current flowing through the capacitor C2. The positive orientations of the currents I1, I2L3, I2L4, I2, I2T are as described in FIG. 15.

Figure 18:
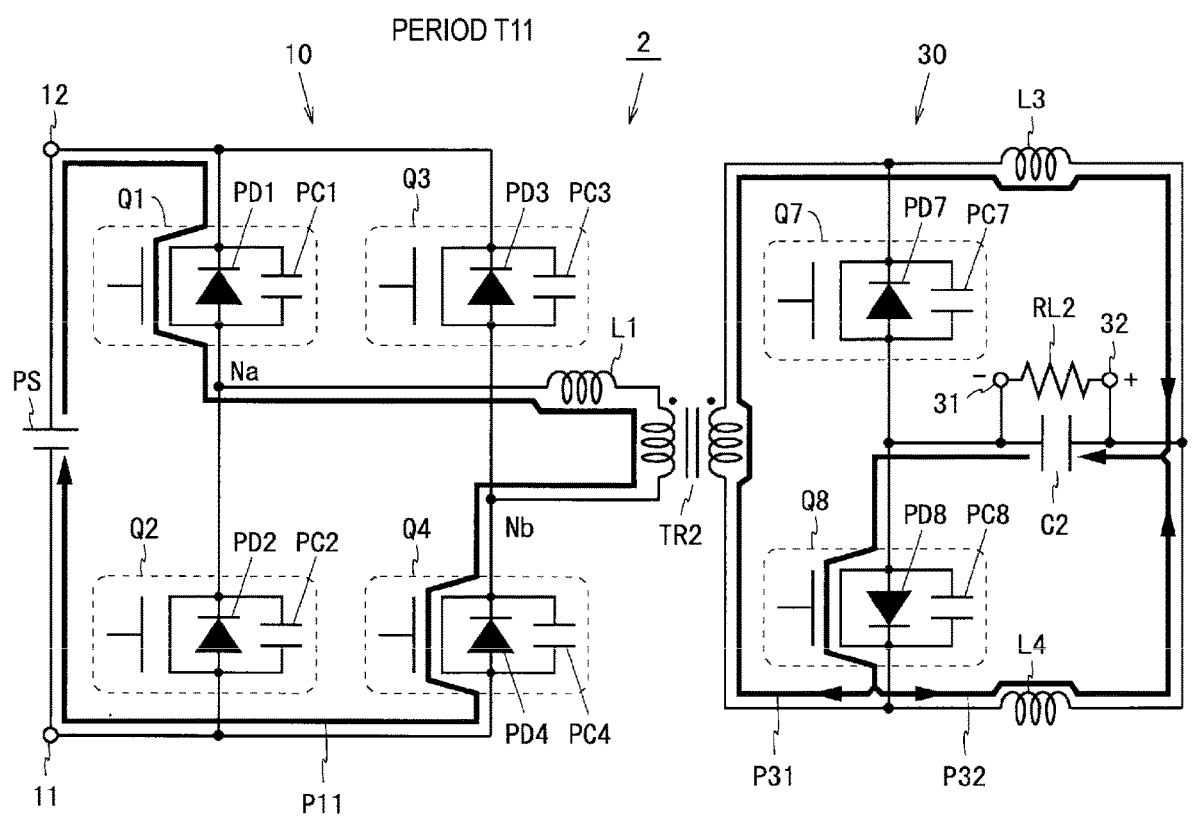
FIG. 18 is a current path diagram of the period T11 of the power supply illustrated in FIG. 15.

FIG. 18 is a current path diagram of the period T11. In the period T11, the MOSFETs Q1, Q4, Q8 are in an on state, and the MOSFETs Q2, Q3, Q7 are in an off state. In the primary circuit 10, the current flows through the path P11 described above. The current I1 increases over time, and the power is stored in the coil L1. In the secondary circuit 30, voltage is induced in the secondary winding of the transformer TR2. The current flows through a path P31 sequentially passing through the first end of the secondary winding of the transformer TR2, the coil L3, the capacitor C2, the MOSFET Q8, and the second end of the secondary winding of the transformer TR2. The current I2L3 increases over time, and the power is stored in the coil L3. Because power stored before the first half cycle remains in the coil L4, the current also flows in a path P32 sequentially passing through the second end of the coil L4, the capacitor C2, the MOSFET Q8, and the first end of the coil L4. At this time, the capacitor C2 is charged. In the period T11, power is transmitted from the primary circuit 10 to the secondary circuit 30.

At the start of the period T12, the MOSFET Q4 is turned off. In the period T12, the MOSFETs Q1, Q8 are in an on state, and the MOSFETs Q2 to Q4, Q7 are in an off state. For the same reason as in the first embodiment, the off operation of the MOSFET Q4 corresponds to zero voltage switching.

Figure 19:
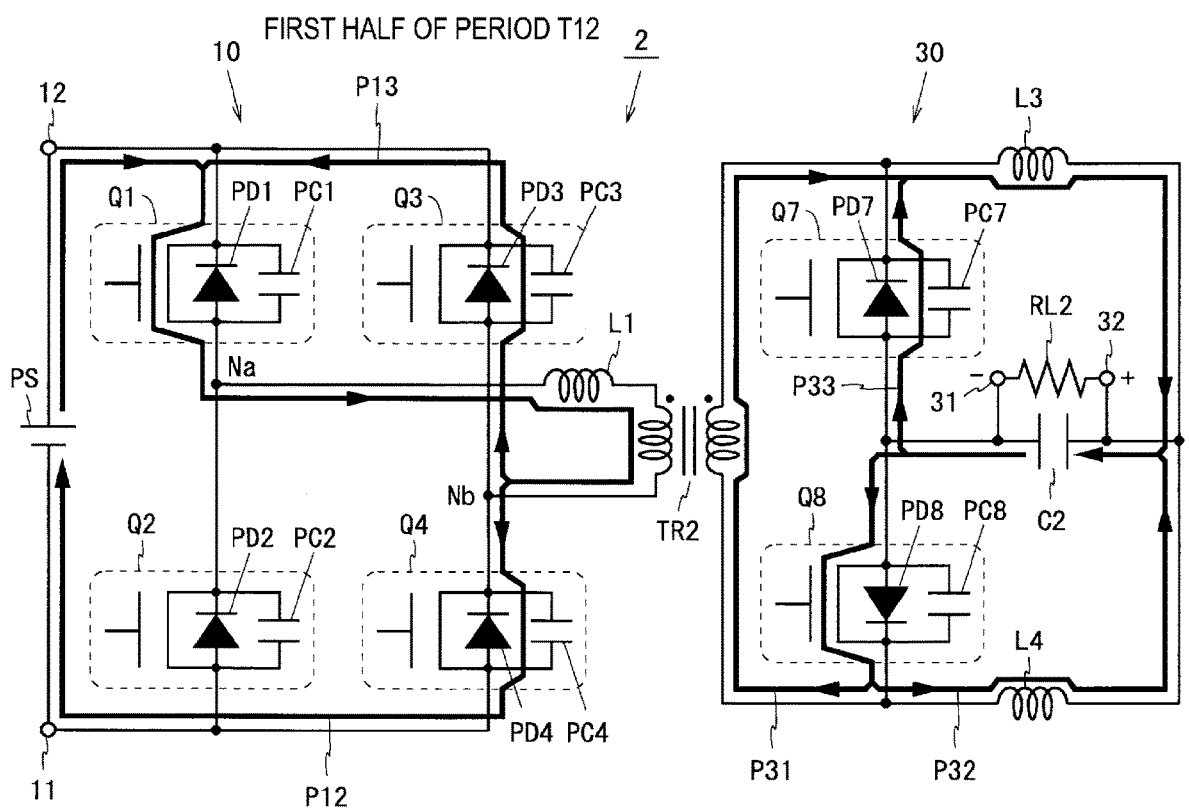
FIG. 19 is a current path diagram of the first half of the period T12 of the power supply illustrated in FIG. 15.

Similar to the first embodiment, the current path in the primary circuit 10 changes in the middle of the period T12. FIG. 19 is a current path diagram of the first half of the period T12. In the primary circuit 10, the current flows through the paths P12, P13 described above. At this time, the parasitic capacitor PC3 is discharged, and the parasitic capacitor PC4 is charged. Thus, the potential of the node Nb rises, the potential difference (Va−Vb) between the nodes Na, Nb decreases, and the current I1 decreases. In the secondary circuit 20, the current continues to flow through the paths P31, P32 described above. Further, because the electromotive force of the secondary winding of the transformer TR2 is reduced, a parasitic capacitor PC7 is discharged. Thus, the current also flows in a path P33 sequentially passing through the first output terminal 31, the parasitic capacitor PC7, the coil L3, and the second output terminal 32.

When the discharging of the parasitic capacitor PC3 and the charging of the parasitic capacitor PC4 are completed, the second half of the period T12 begins. In the primary circuit 10, the potential difference (Va−Vb) between the nodes Na, Nb becomes substantially zero, and the current returns through the path P14 described above (refer to FIG. 6). At this time, the current I1 is substantially constant. In the secondary circuit 30, the current continues to flow through the paths P31 to P33 described above. The currents I2L3, I2L4 are both reduced by the action of the voltage across the capacitor C2.

The MOSFET Q3 is turned on at the start of the period T13, and the MOSFET Q7 is turned on in the middle of the period T13. Hereinafter, the period until the MOSFET Q7 is turned on is referred to as a first half of the period T13, and the subsequent period is referred to as a second half of the period T13. In the period T13, the MOSFETs Q1, Q3, Q8 are in an on state, and the MOSFETs Q2, Q4 are in an off state. The MOSFET Q7 is in an off state in the first half of the period T13 and an on state in the second half of the period T13. For the same reason as in the first embodiment, the on operation of the MOSFET Q3 corresponds to zero voltage switching.

In the first half of the period T13, in the primary circuit 10, the current flows through the path P15 described above (see FIG. 7). At this time, the current I1 is substantially constant. In the secondary circuit 30, the current continues to flow through the paths P31 to P33 described above. The currents I2L3, I2L4 both continue to be reduced by the action of the voltage across the capacitor C2.

Figure 20:
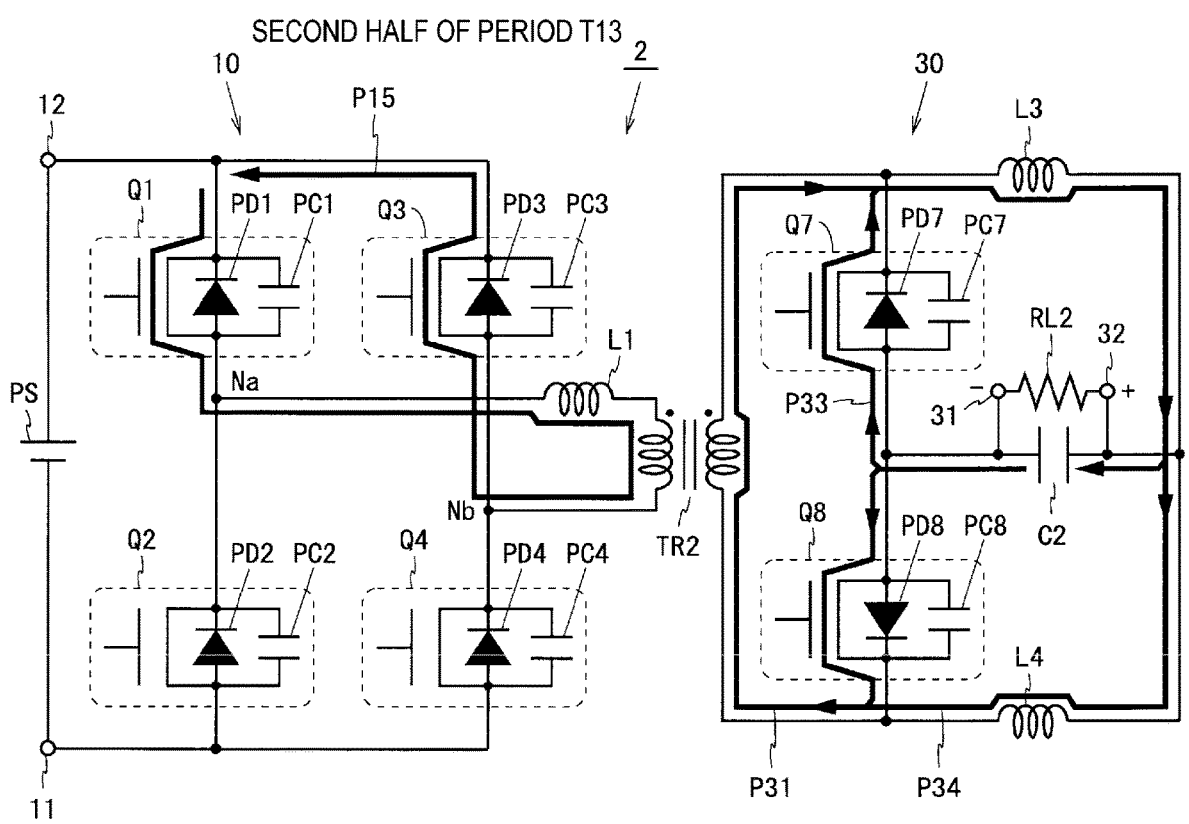
FIG. 20 is a current path diagram of the second half of the period T13 of the power supply illustrated in FIG. 15.

Before the current I2L4 becomes 0, the MOSFET Q7 is turned on, and the second half of the period T13 begins. FIG. 20 is a current path diagram of the second half of the period T13. In the primary circuit 10, the current continues to return through the path P15 described above. At this time, the current I1 is substantially constant. In the secondary circuit 30, soon after the MOSFET Q7 is turned on, the current I2L4 becomes negative (the orientation of the current I2L4 is reversed). At this time, the current flows through the paths P31, P33 described above; and a path P34 passing through the coil L4 after the coil L3 in the path P31. The currents I2L3, I2L4 continue to decrease and the current I2, which is the sum of the currents I2L3, I2L4, eventually becomes negative (the orientation of the current I2 is reversed). At this time, the capacitor C2 starts discharging.

The MOSFET Q1 is turned off at the start of the period T14, and the MOSFET Q8 is turned off in the middle of the period T14. In the period T14, the MOSFETs Q3, Q7 are in an on state, and the MOSFETs Q1, Q2, Q4 are in an off state. The MOSFET Q8 is in an on state until the middle of the period and subsequently in an off state. For the same reason as in the first embodiment, the off operation of the MOSFET Q1 corresponds to zero voltage switching. As illustrated in FIG. 17, the period T14 is divided into the period T141 until the MOSFET Q8 starts the off operation, the period T142 until the current flowing through the MOSFET Q8 becomes 0, and the subsequent period T143.

Figure 21:
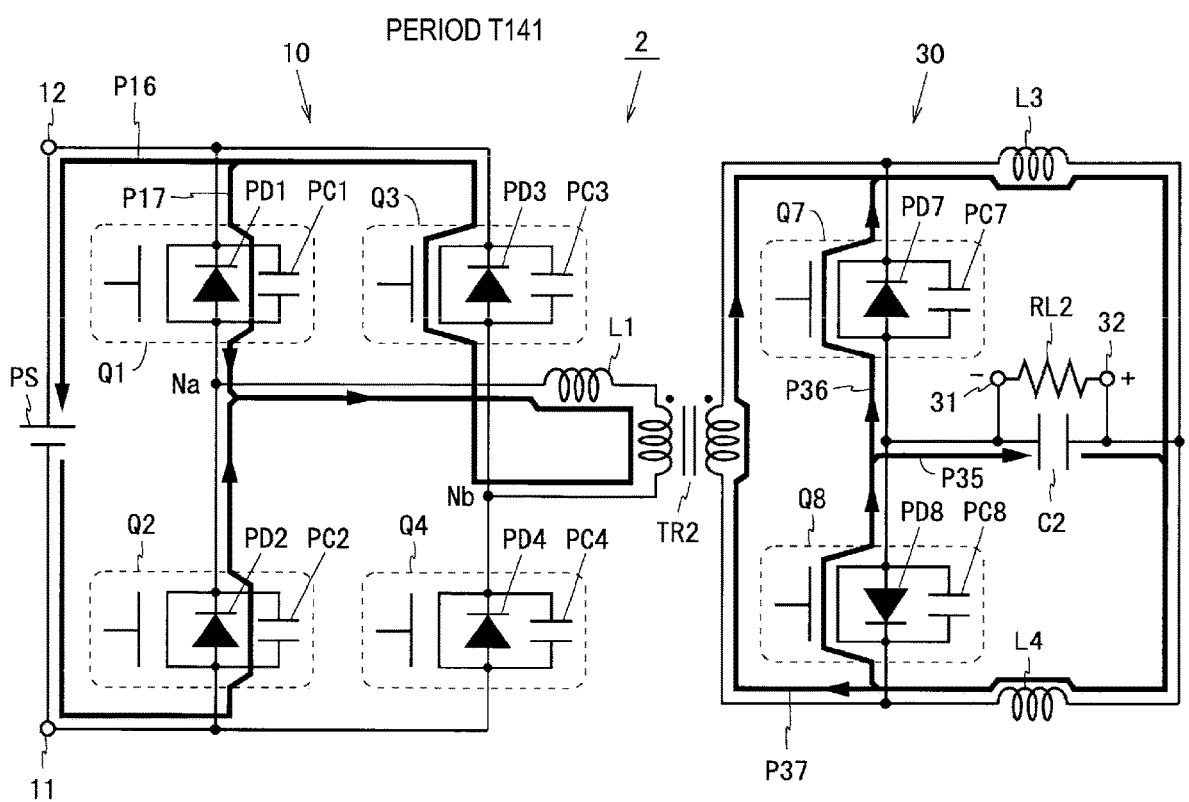
FIG. 21 is a current path diagram of the period T141 of the power supply illustrated in FIG. 15.

FIG. 21 is a current path diagram of the period T141. In the primary circuit 10, the current flows through the paths P16, P17 described above. At this time, the parasitic capacitor PC1 is charged, and the parasitic capacitor PC2 is discharged. Thus, the potential (and the voltage VQ2SD) of the node Na is reduced. In the period T141, the current flows toward the second input terminal 12, which is a positive input terminal. To make the current flow, the power stored in the coil L1 is used. Thus, the current I1 rapidly decreases and eventually becomes zero. In the secondary circuit 30, the current flows through a path P35 sequentially passing through the second output terminal 32, the coil L4, the MOSFET Q8, and the first output terminal 31; a path P36 sequentially passing through the MOSFET Q7 after the MOSFET Q8, and the coil L3; and a path P37 sequentially passing through the secondary winding of the transformer TR2 after the coil L4 and the coil L3. At this time, the capacitor C2 starts discharging.

Figure 22:
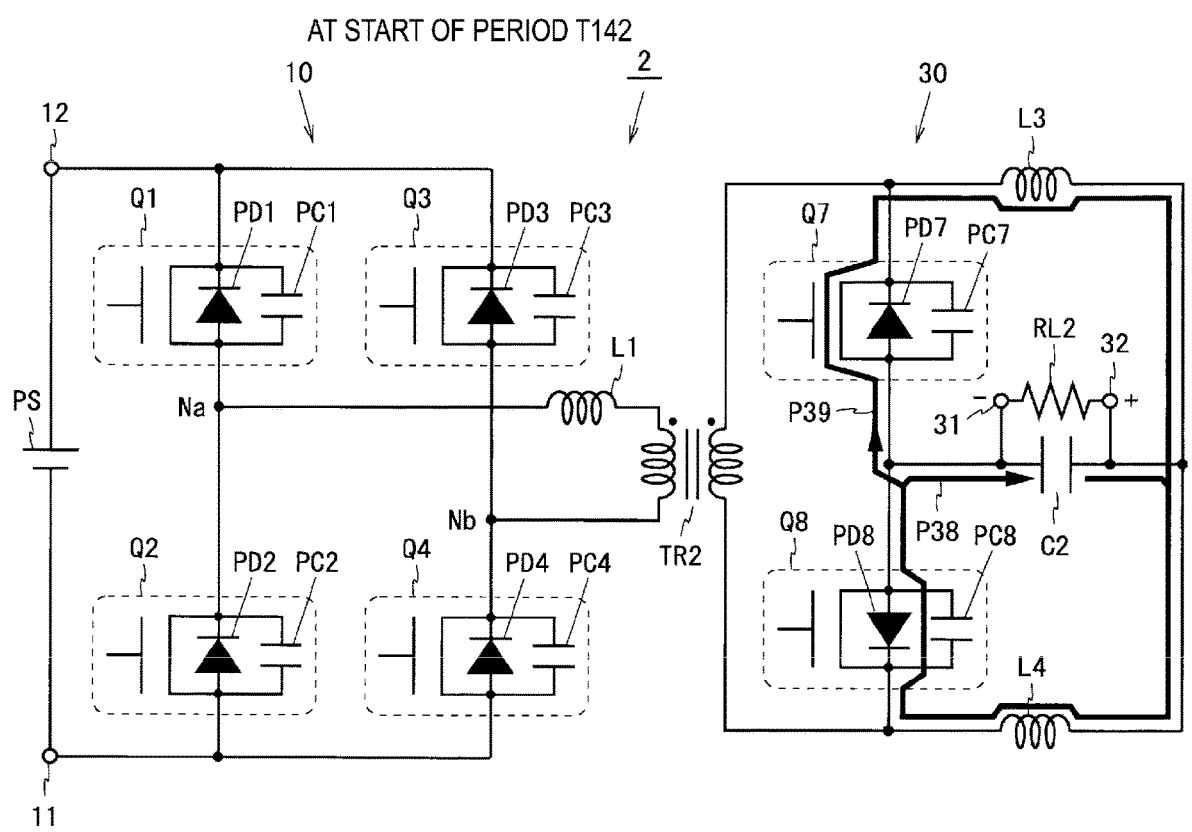
FIG. 22 is a current path diagram of the start of the period T142 of the power supply illustrated in FIG. 15.

FIG. 22 is a current path diagram of the start of the period T142 (the moment MOSFET Q8 is turned off). At this time, current does not flow in the primary circuit 10. In the secondary circuit 30, the current flows through a path P38 sequentially passing through the second output terminal 32, the coil L4, a parasitic capacitor PC8, and the first output terminal 31; and a path P39 sequentially passing through the MOSFET Q7 after the parasitic capacitor PC8 and the coil L3. At this time, the parasitic capacitor PC8 is charged. The current I1 is zero, and thus the current I2T is also zero. However, here, the excitation current flowing through the transformer TR2 is ignored. In the period T142, as the parasitic capacitor PC8 is charged, the current flowing through the parasitic capacitor PC8 decreases and approaches 0. As a result, the current I2T begins to flow. This induces a voltage in the primary winding of the transformer TR2, and the current I1 increases once again.

Figure 23:
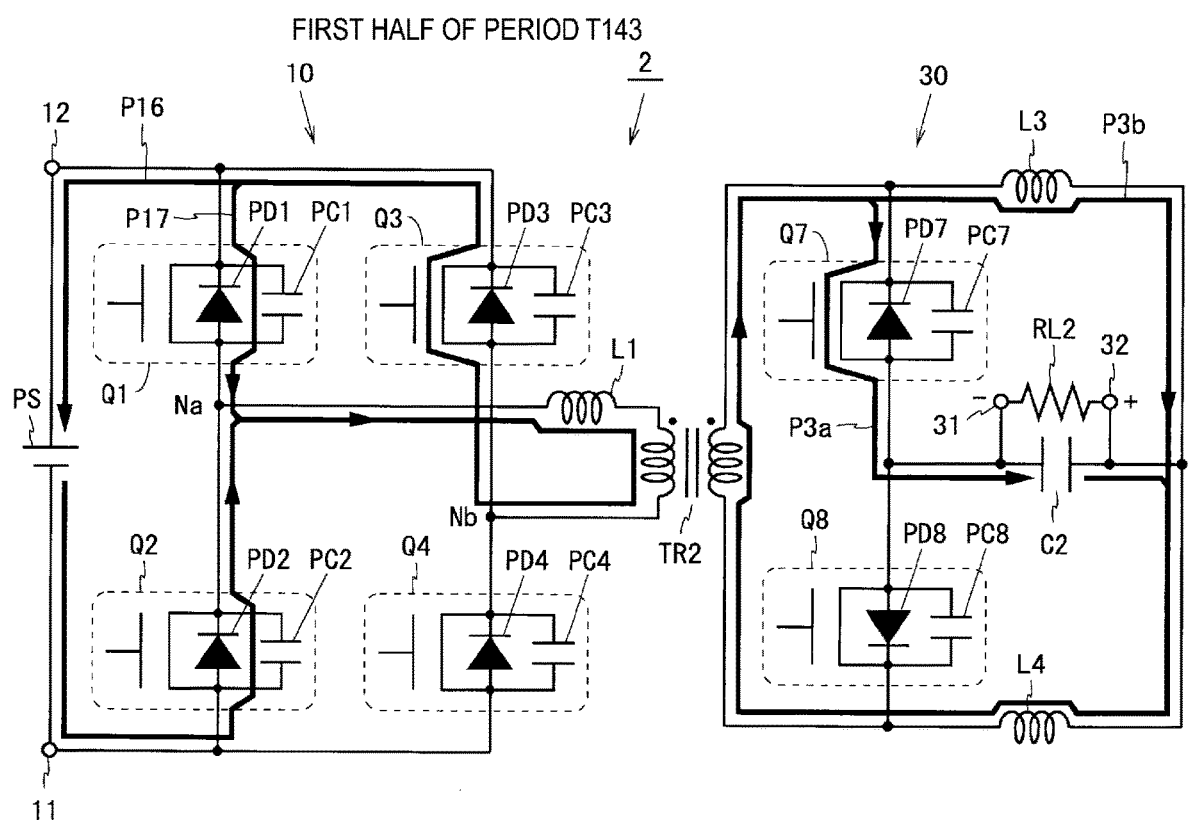
FIG. 23 is a current path diagram of the first half of the period T143 of the power supply illustrated in FIG. 15.

Similar to the first embodiment, the current path in the primary circuit 10 changes in the middle of the period T143. FIG. 23 is a current path diagram of the first half of the period T143. In the primary circuit 10, the current flows once again through the same paths as those in the period T141 (paths P16, P17 described above). As a result, the charging of the parasitic capacitor PC1 and the discharging of the parasitic capacitor PC2 are resumed. Thus, the potential of the node Na (and the voltage VQ2SD) is reduced once again. In the secondary circuit 20, the current flows through a path P3a passing sequentially through the second output terminal 32, the coil L4, the secondary winding of the transformer TR2, the MOSFET Q7, and the first output terminal 31; and a path P3b flowing through the coil L3 after the secondary winding of the transformer TR2.

Figure 24:
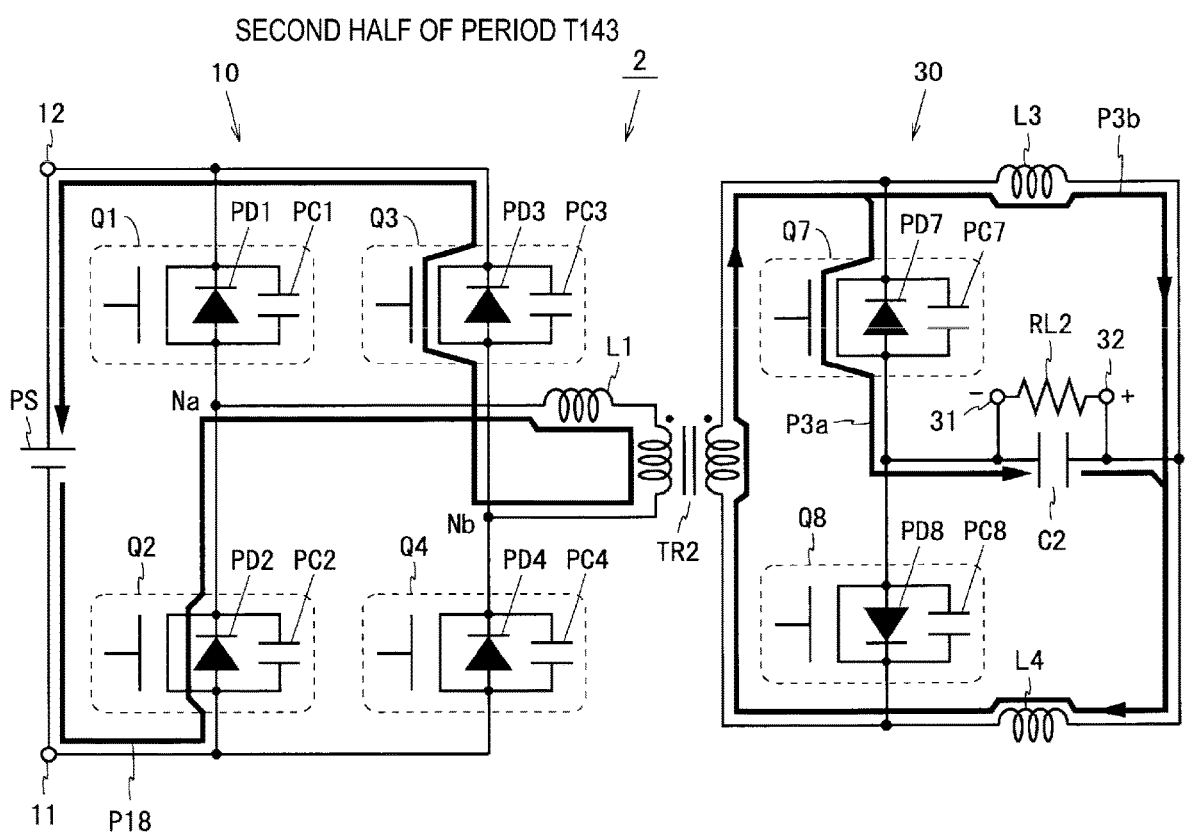
FIG. 24 is a current path diagram of the second half of the period T143 of the power supply illustrated in FIG. 15.

When the voltage VQ2SD becomes substantially zero, the second half of the period T143 begins. FIG. 24 is a current path diagram of the second half of the period T143. In the primary circuit 10, the current flows through the path P18 described above. In the secondary circuit 30, the current continues to flow through the paths P3a to P3b described above.

In this way, in the period T14, the capacitor C2 is discharged. Further, in the secondary circuit 30, the discharge current of the capacitor C2 flows from the second end toward the first end of the secondary winding of the transformer TR2, inducing voltage in the primary winding of the transformer TR2. As a result, in the primary circuit 10, the current I1 flows in a direction that makes the voltage VQ2SD zero.

At the start of the period T15, the MOSFET Q2 is turned on. For the same reason as in the first embodiment, the on operation of the MOSFET Q2 corresponds to zero voltage switching. Note that in a case that the MOSFET Q8 is not turned off in the middle of the period T14 (that is, in a case that no discharge current of the capacitor C2 flows from the second end toward the first end of the secondary winding of the transformer TR1), the voltage VQ2SD and the current I1 respectively change as indicated by the dot-dash lines W3, W4 in FIG. 17. The on operation of the MOSFET Q2 in this state does not correspond to zero voltage switching.

In the periods T15 to T18, the power supply 2 operates symmetrically with the periods T11 to T14. Specifically, the operations of the MOSFETs Q1 to Q4, Q7, Q8 in the periods T15 to T18 are the same as the operations of the MOSFETs Q3, Q4, Q1, Q2, Q8, Q7 in the periods T11 to T14, respectively. The changes in the currents I2L3, I2L4 in the periods T15 to T18 are the same as the changes in the currents I2L4, I2L3 in the periods T11 to T14. The changes in the current I1 in the periods T15 to T18 are opposite to the changes in the current I1 in the periods T11 to T14 (absolute values are the same; positive and negative values are reversed).

In the power supply 2, before the MOSFET Q2 is turned on, the capacitor C2 starts discharging. In the period T141, the current flows through the path P35 passing through the coil L4 and the MOSFET Q8 and the like, from a positive electrode terminal (terminal on the right side in the drawing) toward a negative electrode terminal (terminal on the left side in the drawing) of the capacitor C2 (refer to FIG. 21). At the start of period T142, when the MOSFET Q8 is turned off, the current flows through the path P3a passing through the coil L4, the secondary winding of the transformer TR2, and the MOSFET Q7 (refer to FIG. 23). As a result, the current flows from the second end toward the first end of the secondary winding of the transformer TR2, voltage is induced in the primary winding of the transformer TR2, and the current I1 flows. The flow of the current I1 reduces the voltage VQ2SD.

The switching loss can be reduced by turning the MOSFET Q2 on after the voltage VQ2SD is reduced. In particular, the switching loss can be reduced by turning the MOSFET Q2 on after the voltage VQ2SD is reduced to substantially 0. Thus, in the power supply 2, the power stored in the capacitor C2 of the secondary circuit 30 is transmitted to the primary circuit 10, and the MOSFET Q2 is turned on after reducing the source-drain voltage of the MOSFET Q2. As a result, the switching loss can be reduced at the on operation of the MOSFET Q2. The power supply 2, using this same method, provides the reduced switching loss at the on operation of the MOSFETs Q1, Q3, Q4.

As described above, in the power supply 2 according to the present embodiment, the rectifier circuit (the secondary circuit 30) includes the first switching element (MOSFET Q7) and the second switching element (MOSFET Q8) as rectifier elements; and the first coil L3 and the second coil L4. The first end (left end in the drawing) of the capacitor C2 is connected to the first end (upper end in the drawing) of the secondary winding of the transformer TR2 with the first switching element (MOSFET Q7) therebetween and is connected to the second end (lower end in the drawing) of the secondary winding with the second switching element (MOSFET Q8) therebetween, and the second end (right end in the drawing) of the capacitor C2 is connected to the first end of the secondary winding with the first coil L3 therebetween and is connected to the second end of the secondary winding with the second coil L4 between. The rectifier circuit performs, as a discharge operation, an operation of making a current flow into the path P35 passing through the second switching element and the second coil L4 to start discharge of the capacitor C2; and an operation of subsequently turning off the second switching element to cause a current to flow into the path P3a passing through the second coil L4, the secondary winding, and the first switching element.

Thus, in the rectifier circuit having the configuration described above, a current is made to flow through the path P35 passing through the second switching element and the second coil to start discharge of the capacitor C2, and subsequently the second switching element is turned off, making it possible to cause a current to flow into the secondary winding of the transformer TR2 and to reduce the voltage (source-drain voltage) between the conduction electrodes of the switching elements included in the switching circuit even during low output. Accordingly, it is possible to perform zero voltage switching of the switching elements and increase the power conversion efficiency even during low output.

The power supply 2 according to the present embodiment can constitute the following modified example. In the power supply 2, the primary circuit 10 is a full-bridge circuit, and the secondary circuit 30 is a current doubler circuit. In the power supply according to the modified example, the primary circuit and the secondary circuit may both be full-bridge circuits. In the power supply according to the modified example, one of the primary circuit and the secondary circuit operates as the switching circuit, and the other operates as the rectifier circuit. A bi-directional DC/DC converter can be configured by replacing both functions as necessary.

Third Embodiment

Figure 25:
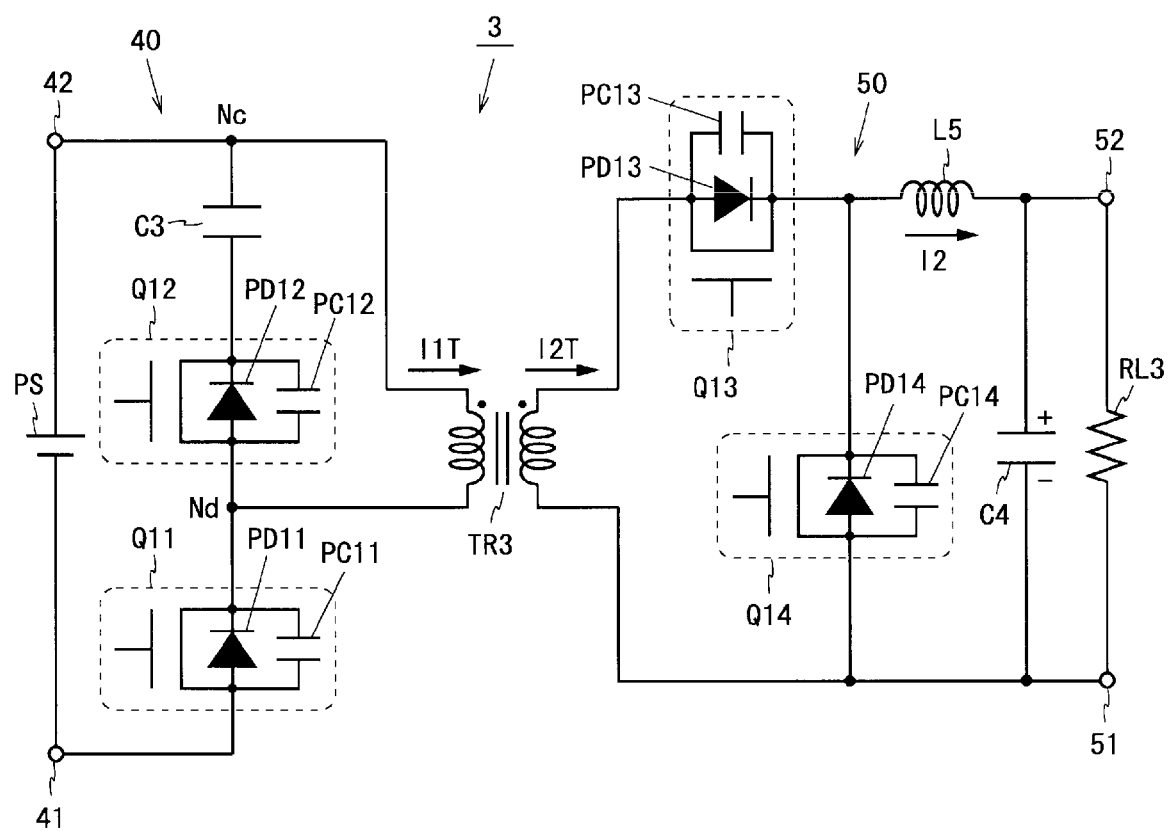
FIG. 25 is a circuit diagram of a power supply according to a third embodiment.

FIG. 25 is a circuit diagram of a power supply according to a third embodiment. A power supply 3 illustrated in FIG. 25 is a DC/DC converter including N-channel type MOSFETs Q11 to Q14, a transformer TR3, a coil L5, and capacitors C3, C4. The MOSFETs Q1 to Q14 respectively include parasitic diodes PD11 to PD14 and parasitic capacitors PC11 to PC14. Note that in a case that the electrostatic capacitance of the parasitic capacitors PC11 to PC14 is insufficient, a capacitor may be externally connected in parallel to each of the parasitic capacitors PC11 to PC14.

The power supply 3 includes a primary circuit 40 on a primary side of the transformer TR3 and a secondary circuit 50 on a secondary side of the transformer TR3. The primary circuit 40 includes a first input terminal 41 as a negative input terminal and a second input terminal 42 as a positive input terminal. The secondary circuit 50 includes a first output terminal 51 as a negative output terminal and a second output terminal 52 as a positive output terminal. The direct current power supply PS is connected between the first and second input terminals 41, 42, and a load RL3 is connected between the first and second output terminals 51, 52.

The MOSFETs Q11 to Q14 are switching elements similar to the MOSFETs Q1 to Q8. The primary circuit 40 includes the MOSFETs Q11, Q12 and the capacitor C3. The secondary circuit 50 includes the MOSFETs Q13, Q14, the coil L5, and the capacitor C4.

In the primary circuit 40, a first end (upper end in the drawing) of the primary winding of the transformer TR3 and a first end (upper end in the drawing) of the capacitor C3 are connected to the second input terminal 42. A source electrode of the MOSFET Q11 is connected to the first input terminal 41, and a drain electrode of the MOSFET Q11 is connected to the source electrode of the MOSFET Q12 and to a second end of the primary winding of the transformer TR3. A drain electrode of the MOSFET Q12 is connected to a second end of the capacitor C3. Hereinafter, a node where a first end of the transformer TR3 is connected is referred to as Nc, a node where the second end of the transformer TR3 is connected is referred to as Nd, and potentials of the nodes Nc, Nd are referred to as Vc, Vd, respectively.

In the secondary circuit 50, the capacitor C4 is connected between the first and second output terminals 51, 52. A source electrode of the MOSFET Q13 is connected to a first end (upper end in the drawing) of the secondary winding of the transformer TR3, and a drain electrode of the MOSFET Q13 is connected to a drain electrode of the MOSFET Q14 and a first end (left end in the drawing) of the coil L5. A second end of the coil L5 is connected to the second output terminal 52. A source electrode of the MOSFET Q14 and a second end of the secondary winding of the transformer TR3 are connected to the first output terminal 51.

In this way, the primary circuit 40 is a switching circuit connected to the primary winding of the transformer TR3.

This switching circuit is a forward circuit. The secondary circuit 50 is a rectifier circuit connected to the secondary winding of the transformer TR3. This rectifier circuit is a forward circuit. In the secondary circuit 50, a first end (upper end in the drawing) of the capacitor C4 is connected to the first end of the secondary winding of the transformer TR3 with the coil L5 and the MOSFET Q13 therebetween and is connected to the second end of the secondary winding of the transformer TR3 with the coil L5 and the MOSFET Q14 therebetween. A second end of the capacitor C4 is connected to the second end of the secondary winding of the transformer TR3. Both the MOSFETs Q13, Q14 are rectifier elements that rectify the power transmitted from the primary side of the transformer TR3, and the capacitor C3 stores the rectified power.

For the coil L5, a coil having an inductance of from 10 to 100 pH, for example, is used. For the capacitor C3, a capacitor having a capacitance of from 0.01 to 10 µF, for example, is used, and for the capacitor C4, a capacitor having a capacitance of from 20 to 1,000 µF, for example, is used. The inductance of the coil L5 and the capacitance of the capacitors C3, C4 may be values outside the ranges described above.

In the primary circuit 40, the MOSFET Q11 performs a switching operation. In this way, the direct current supplied from the direct current power supply PS is intermittently supplied to the primary winding of the transformer TR3. The MOSFET Q12 and capacitor C3 function as a circuit for resetting the power resulting from the excitation current of the transformer TR3. The transformer TR3 transforms the voltage supplied to the primary winding and outputs the voltage from the secondary winding. In the secondary circuit 50, the transformed alternating current supplied from the secondary winding of the transformer TR3 is rectified, and the capacitor C4 is charged. In this way, the power supply 3 converts the voltage level of the power supplied from the direct current power supply PS and supplies the power in the converted voltage to the load RL3.

Figure 26:
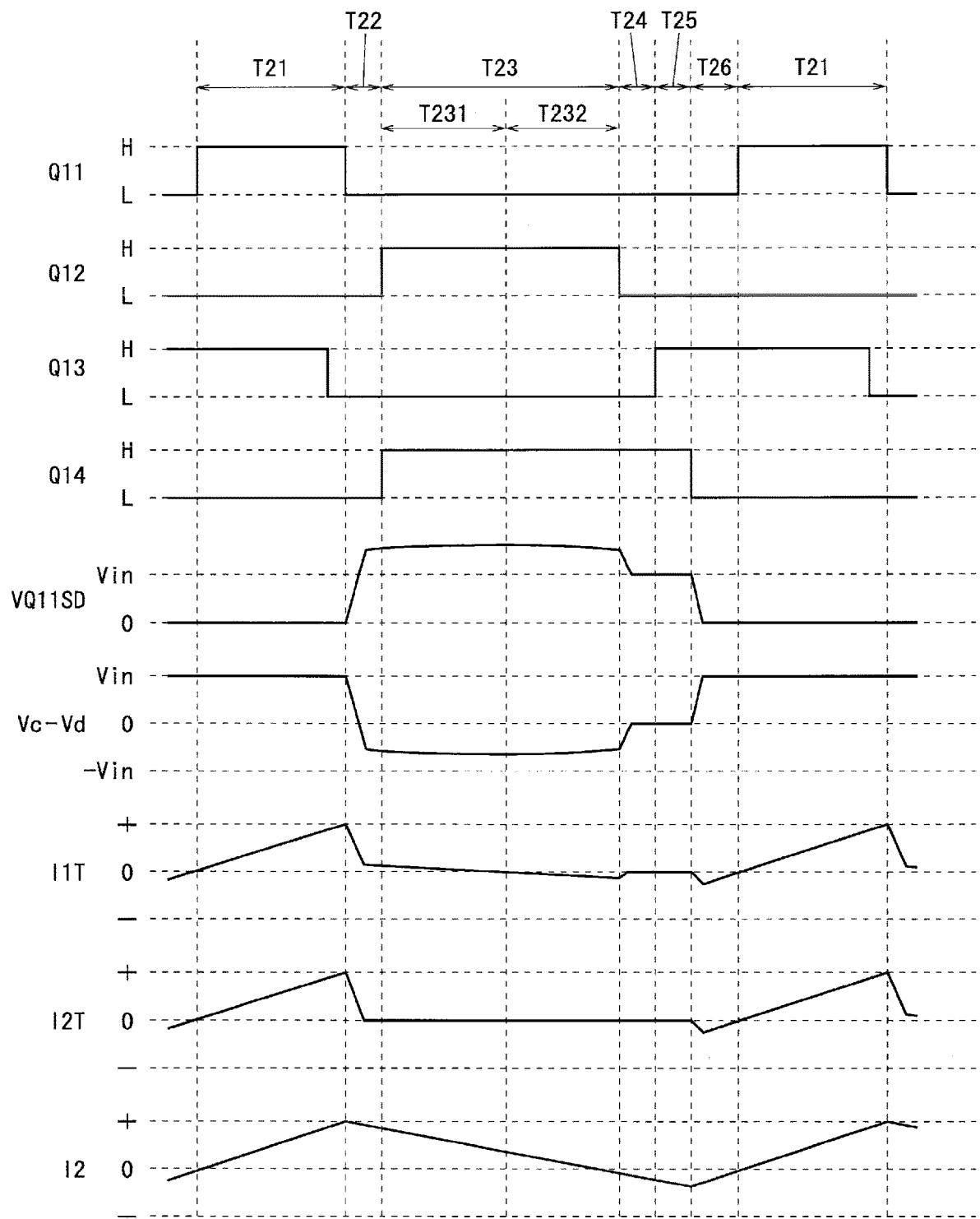
FIG. 26 is a timing chart of the power supply illustrated in FIG. 25.

The operation of the power supply 3 in a case that the output power is relatively small will now be described with reference to FIG. 26 to FIG. 33. FIG. 26 is a timing chart of the power supply 3 in a case that the output power is relatively small. FIG. 26 illustrates changes in the gate potential of the MOSFETs Q11 to Q14, a source-drain voltage VQ11SD of the MOSFET Q11, a potential difference (Vc−Vd) between the nodes Nc, Nd, the current I1T flowing through the primary winding of the transformer TR3, the current I2T flowing through the secondary winding of the transformer TR3, and the current I2 flowing through the coil L5. In a case that the current flowing through the load RL3 is negligible, the current I2 is equal to the current flowing through the capacitor C4. The positive orientations of the currents I1T, I2T, I2 are as described in FIG. 25. One cycle of operation of the power supply 3 is divided into six periods T21 to T26, and the period T23 is further divided into two periods T231, T232.

As illustrated in FIG. 26, the MOSFET Q13 is turned off in the middle of the period T21. Hereinafter, the period until the MOSFET Q13 is turned off is referred to as a first half of the period T21, and the subsequent period is referred to as a second half of the period T21. In the period T21, the MOSFET Q11 is in an on state, and the MOSFETs Q12, Q14 are in an off state. The MOSFET Q13 is in an on state in the first half of the period T21 and an off state in the second half of the period T21.

Figure 27:
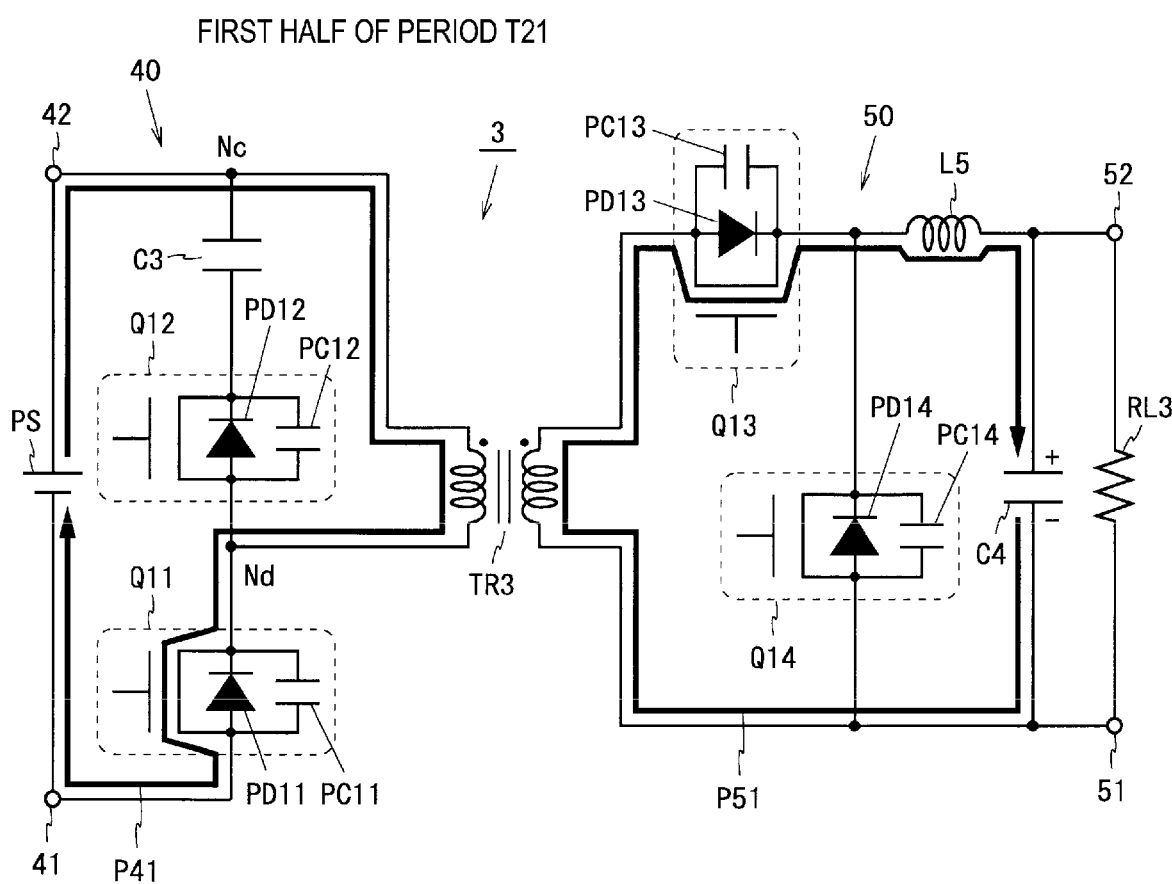
FIG. 27 is a current path diagram of a first half of a period T21 of the power supply illustrated in FIG. 25.

FIG. 27 is a current path diagram of the first half of the period T21. In the primary circuit 40, the current sequentially flows through a path P41 passing sequentially through the second input terminal 42, the primary winding of the transformer TR3, the MOSFET Q11, and the first input terminal 41. The current I1T increases over time. In the secondary circuit 50, voltage is induced in the secondary winding of the transformer TR3. The current flows through a path P51 sequentially passing through the first end of the secondary winding of the transformer TR3, the MOSFET Q13, the coil L5, the capacitor C4, and the second end of the secondary winding of the transformer TR3. At this time, the capacitor C4 is charged. In the first half of the period T21, power is transmitted from the primary circuit 40 to the secondary circuit 50.

At the start of the second half of the period T21, the MOSFET Q13 is turned off. In the second half of the period 21, in the primary circuit 40, the current continues to flow through the path P41 described above. In the secondary circuit 50, the current flows through a path (not illustrated) sequentially passing through the first end of the secondary winding of the transformer TR3, the parasitic diode PD13, the coil L5, the capacitor C4, and the second end of the secondary winding of the transformer TR3.

At the start of the period T22, the MOSFET Q11 is turned off. In the period T22, the MOSFETs Q1 to Q14 are in an off state. Since the MOSFET Q11 includes a parasitic capacitor PC11, the source-drain voltage of the MOSFET Q11 hardly rises when the MOSFET Q11 is turned off. Thus, the off operation of the MOSFET Q11 corresponds to zero voltage switching.

In the period T22, since the MOSFET Q11 is in the off state, the potential of the node Nd rises, and the current I1T decreases. In the current I1T, only an excitation current remains. The secondary winding of the transformer TR3 loses an electromotive force, and the current I2T becomes 0. Due to the excitation current, the voltage (Vc−Vd) across the primary winding of the transformer TR3 is negative, and the voltage VQ11SD exceeds the input voltage Vin. In the secondary circuit 50, the current starts to flow through a path (not illustrated) sequentially passing through the parasitic diode PD14, the coil L5, and the capacitor C4. Further, the current I2 also starts to decrease. Note that, while the necessary excitation current is clearly indicated in the description of the operation of the power supply 3 in the present embodiment, the excitation current is ignored in the other embodiments.

At the start of the period T23, the MOSFETs Q12, Q14 are turned on. In the period T23, the MOSFETs Q12, Q14 are in an on state, and the MOSFETs Q1, Q13 are in an off state. Note that the timings at which the MOSFETs Q12, Q14 are turned on need not necessarily be the same.

Figure 28:
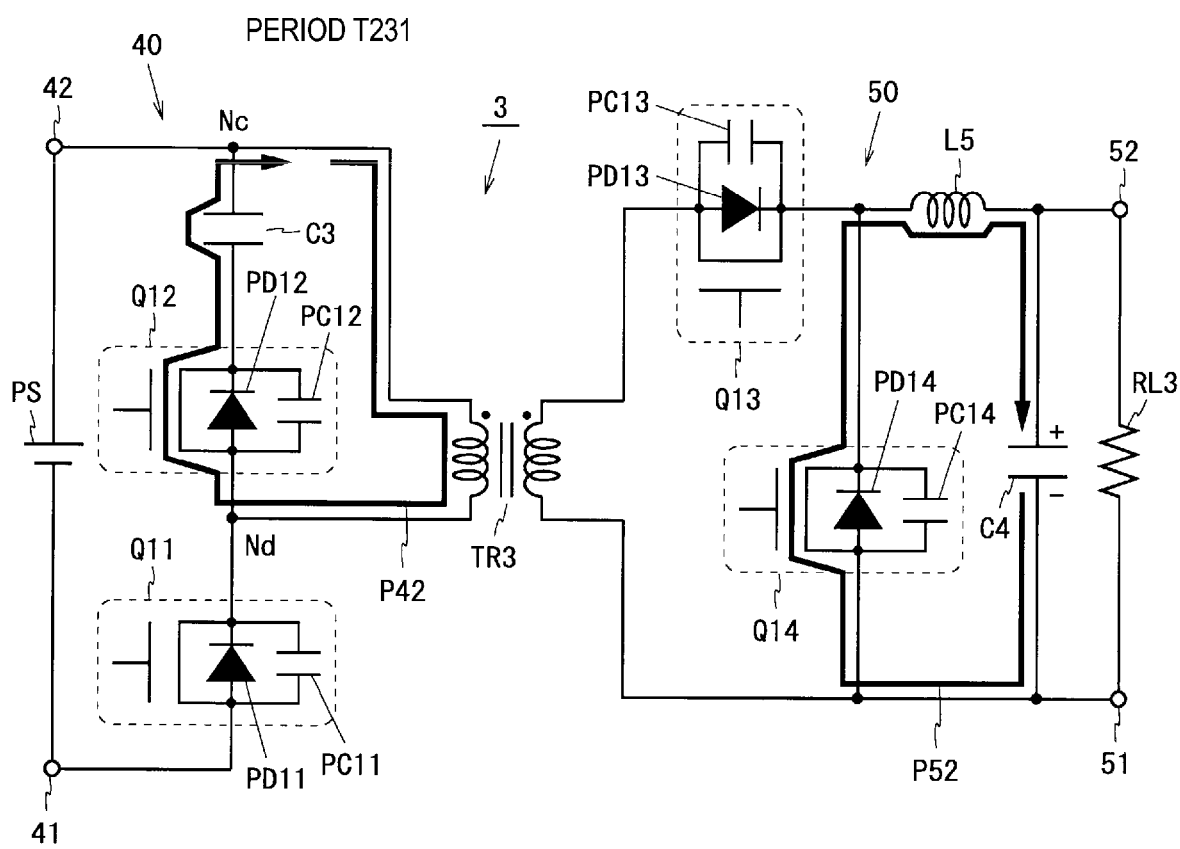
FIG. 28 is a current path diagram of a period T231 of the power supply illustrated in FIG. 25.

FIG. 28 is a current path diagram of the period T231. In the primary circuit 40, excitation current flows in the primary winding of the transformer TR3. The excitation current flows through a path P42 sequentially passing through the second end of the primary winding of the transformer TR3, the MOSFET Q12, the capacitor C3, and the first end of the primary winding of the transformer TR3. At this time, the capacitor C3 is charged, and the current I1T is gradually decreased. In the secondary circuit 50, due to the action of the coil L5 that stored power in the period T21, the current flows through a path P52 sequentially passing through the coil L5, the capacitor C4, and the MOSFET Q14. The current I2 is reduced by the action of the voltage across the capacitor C4.

Figure 29:
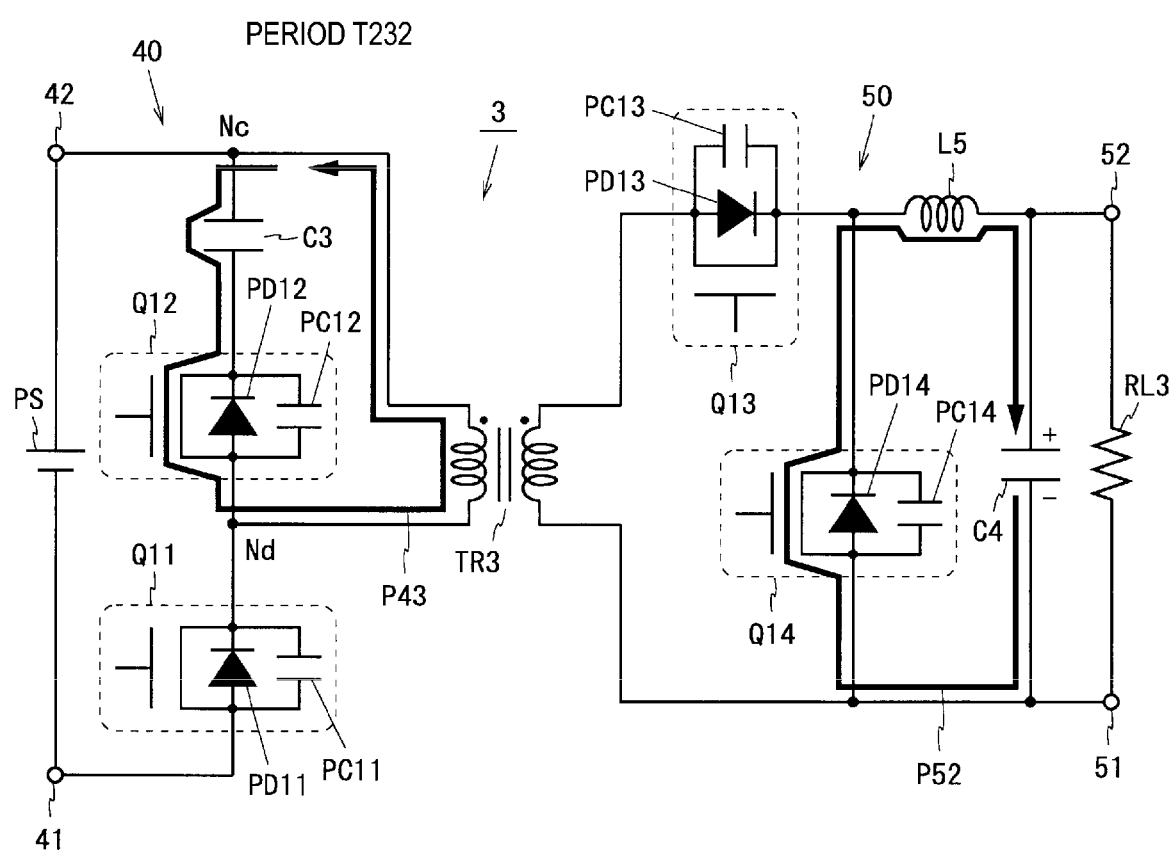
FIG. 29 is a current path diagram of a period T232 of the power supply illustrated in FIG. 25.

When the current I1T becomes 0, the period T232 begins (refer to FIG. 26). FIG. 29 is a current path diagram of the period T232. In the primary circuit 40, the current flows through a path P43 sequentially passing through the first end of the primary winding of the transformer TR3, the capacitor C3, the MOSFET Q12, and the second end of the primary winding of the transformer TR3. At this time, the capacitor C3 is discharged, and the power resulting from the excitation current of the transformer TR3 is reset. In the secondary circuit 50, the current continues to flow through the path P52 described above. The current I2 continues to decrease, and eventually becomes negative (the orientation of the current I2 is reversed). At this time, the capacitor C4 starts discharging.

Figure 30:
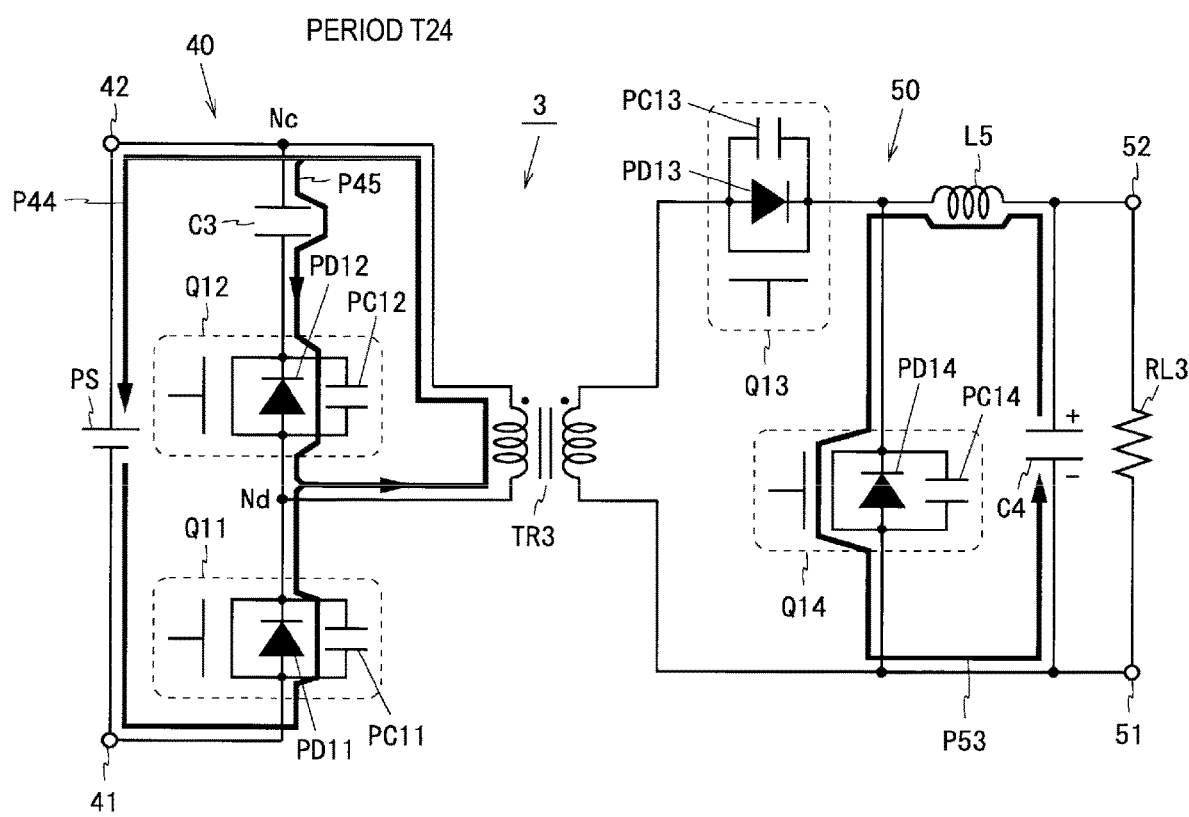
FIG. 30 is a current path diagram of a period T24 of the power supply illustrated in FIG. 25.

At the start of the period T24, the MOSFET Q12 is turned off. In the period T24, the MOSFETs Q11 to Q13 are in an off state, and the MOSFET Q14 is in an on state. FIG. 30 is a current path diagram of the period T24. In the primary circuit 40, the MOSFET Q12 is in the off state, and thus discharge of the capacitor C3 is inhibited. As a result, the potential of the node Nd is reduced. The current flows through a path P44 passing sequentially through the first input terminal 41, the parasitic capacitor PC11, the primary winding of the transformer TR3, and the secondary input terminal 42; and a path P45 sequentially passing through the capacitor C3, after the primary winding of the transformer TR3, and the parasitic capacitor PC12. At this time, the parasitic capacitor PC11 is discharged, and the parasitic capacitor PC12 is charged. In the secondary circuit 50, due to the action of the voltage across the capacitor C4, the current flows through a path P53 sequentially passing through the coil L5, the MOSFET Q14, and the capacitor C4.

In a case that the output power of the power supply 3 is relatively large, an on-duty ratio of the transformer TR3 is large, and the excitation current is also large. Thus, the potential of the node Nd in the period T231 is high, the voltage across the capacitor C3 is high, and the absolute value of the current I1T when the capacitor C3 is discharged during the period T232 is large. Thus, due to the action of the leakage inductance of the primary winding of the transformer TR3, the potential of the node Nd decreases to zero, and the voltage VQ11SD becomes 0. Thus, the on operation of the MOSFET Q11 corresponds to zero voltage switching. On the other hand, in a case that the output power of the power supply 3 is relatively small, the excitation current is small, and thus it is not possible to reduce the voltage at the node Nd to zero. In a case that the output power of the power supply 3 is small, the potential of the node Nd is only reduced to the input voltage Vin (refer to FIG. 26). Here, in the power supply 3, to make the on operation of the MOSFET Q11 correspond to zero voltage switching, the MOSFET Q14 is turned off at the start of the period T26. As a result, as described below, the capacitor C4 can be discharged to cause current to flow into the secondary winding of the transformer TR3, and the power stored in the capacitor C4 can be transmitted to the primary circuit 40 via the transformer TR1.

Figure 31:
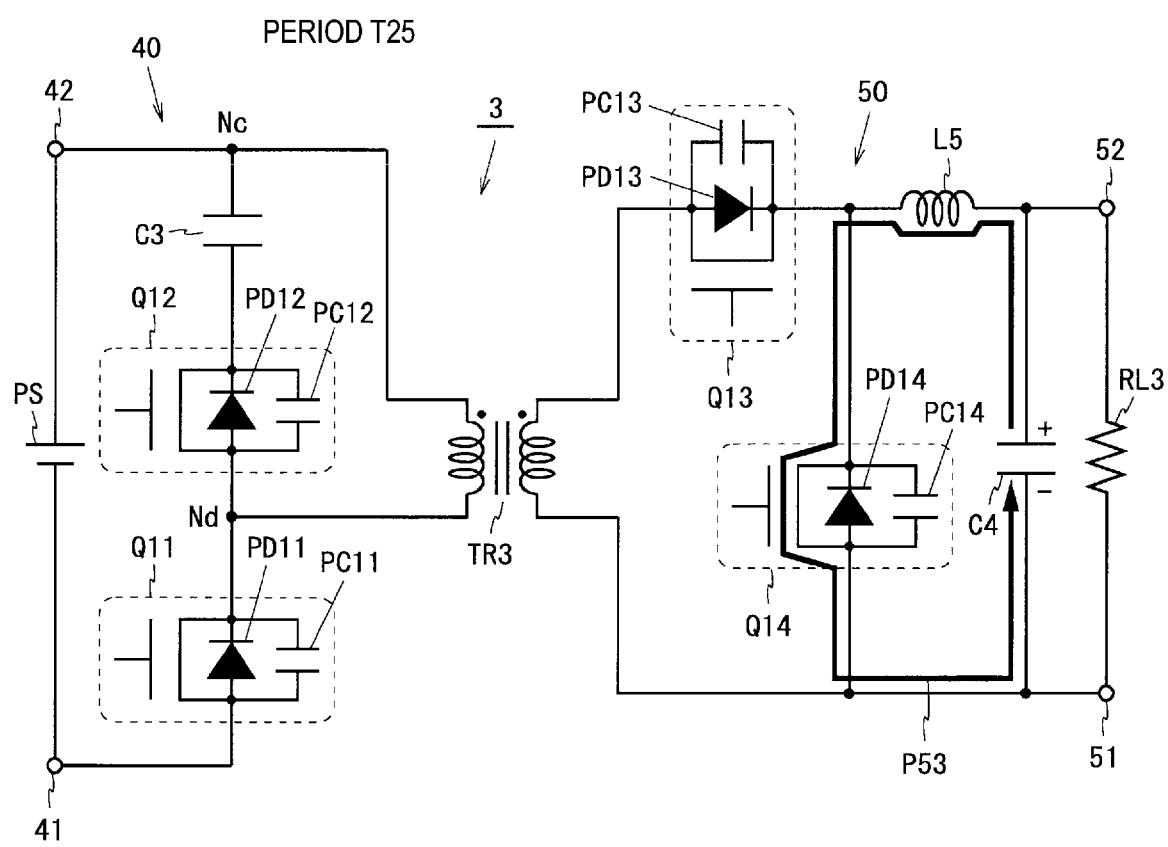
FIG. 31 is a current path diagram of a period T25 of the power supply illustrated in FIG. 25.

At the start of the period T25, the MOSFET Q13 is turned on. In the period T25, the MOSFETs Q11, Q12 are in an off state, and the MOSFETs Q13, Q14 are in an on state. FIG. 31 is a current path diagram of the period T25. In the primary circuit 40, because the potential of the node Nd is equal to the input voltage Vin, no current flows. In the secondary circuit 50, the current continues to flow through the path P53 described above.

At the start of the period T26, the MOSFET Q14 is turned off. In the period T26, the MOSFETs Q11, Q12, Q14 are in an off state, and the MOSFET Q13 is in an on state. The current path in the primary circuit 40 changes in the middle of the period T26. Hereinafter, the period until the current path changes is referred to as a first half of the period T26, and the subsequent period is referred to as a second half of the period T26.

Figure 32:
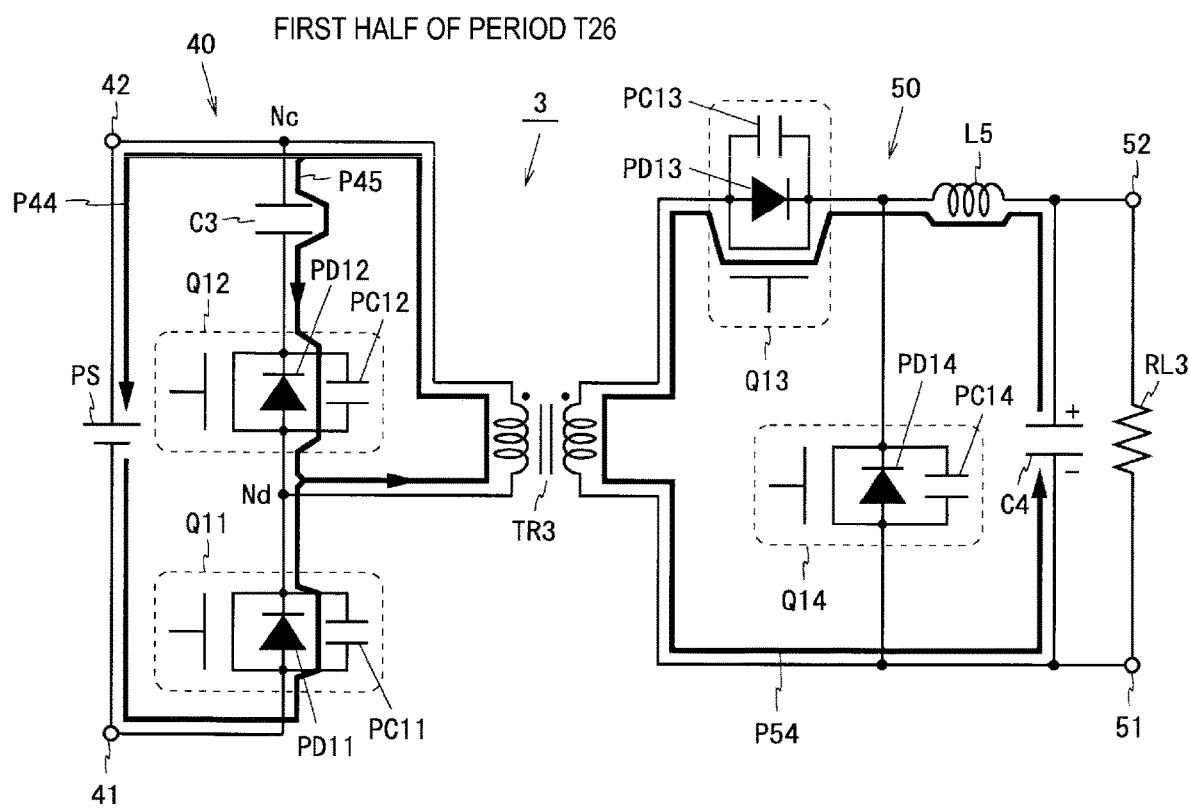
FIG. 32 is a current path diagram of a first half of a period T26 of the power supply illustrated in FIG. 25.

FIG. 32 is a current path diagram of the first half of the period T26. In the primary circuit 40, the current flows once again through the same paths as those in the period T24 (paths P44, P45 described above). As a result, the discharging of the parasitic capacitor PC11 and the charging of the parasitic capacitor PC12 are resumed. Thus, the potential (and the voltage VQ1SD) of the node Nd is reduced once again. In the secondary circuit 50, the current flows through a path P54 sequentially passing through the coil L5, the MOSFET Q13, the secondary winding of the transformer TR3, and the capacitor C4. Because the current flows from the first end to the second end of the secondary winding of the transformer TR3, an electromotive force is generated in the primary winding of the transformer TR3. Thus, the current begins to flow once again from the second end toward the first end of the primary winding of the transformer TR3.

Figure 33:
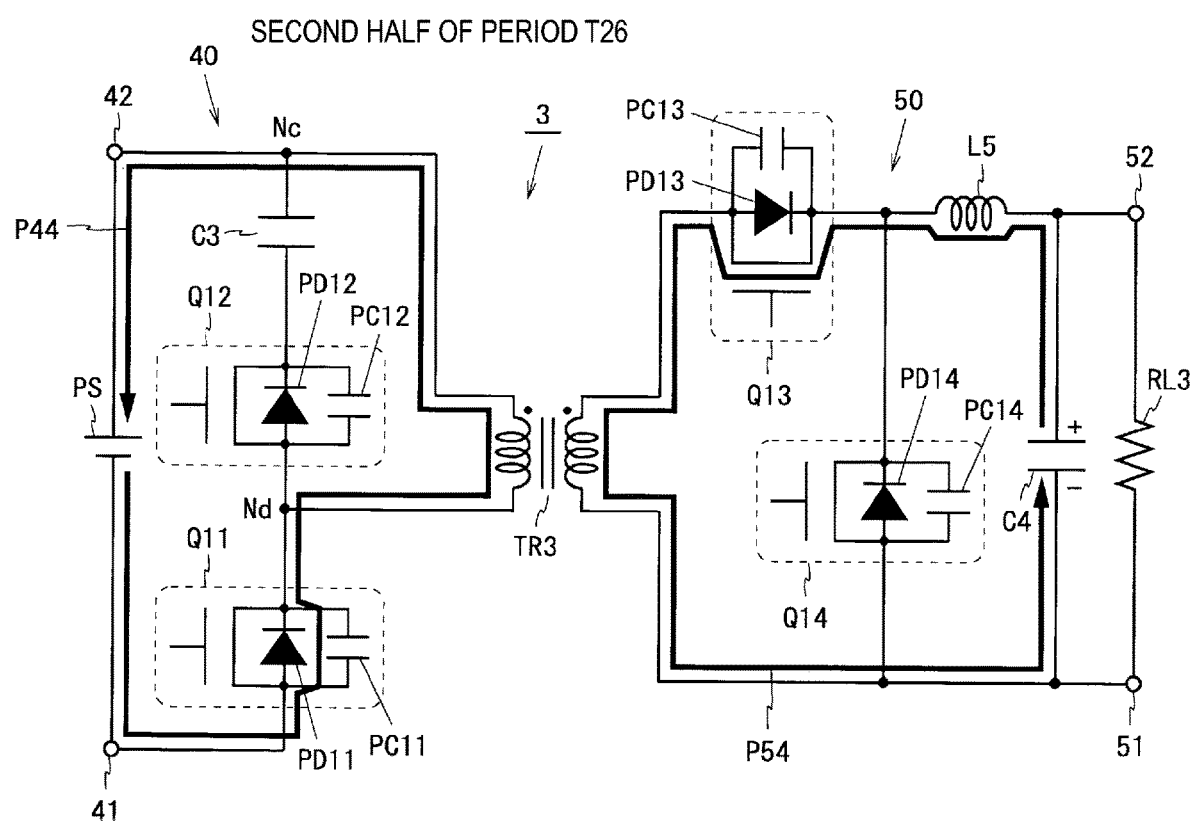
FIG. 33 is a current path diagram of a second half of the period T26 of the power supply illustrated in FIG. 25.

When the voltage VQ11SD becomes substantially zero, the second half of the period T26 begins. FIG. 33 is a current path diagram of the second half of the period T26. In the primary circuit 40, the current flows through the path P44 described above. In the secondary circuit 50, the current continues to flow through the path P54 described above.

In this way, in the periods T24 to T26, the capacitor C4 is discharged. Further, the discharge current of the capacitor C4 flows from the first end toward the second end of the secondary winding of the transformer TR3 via the coil L5, inducing voltage in the primary winding of the transformer TR3. As a result, the current I1T flows in a direction that sets the voltage VQ11SD to zero.

At the start of the next period T21, the MOSFET Q11 is turned on. At the start of the next period T21, the voltage VQ11SD is substantially zero, and a forward current is flowing through the parasitic diode PD11. Thus, the on operation of the MOSFET Q11 corresponds to zero voltage switching.

In the next period T21, in the primary circuit 40, the current flows from the first end to the second end of the primary winding of the transformer TR3 (in the direction opposite to that in the period T26). In the secondary circuit 50, the current flows from the second end to the first end of the secondary winding of the transformer TR3 (in the direction opposite to that in the period T26).

In the power supply 3, before the MOSFET Q11 is turned on, the capacitor C4 starts discharging. In the period T24, the current flows through a path P53 passing through the coil L5 and the MOSFET Q14, from a positive electrode terminal (terminal on the upper side in the drawing) toward a negative electrode terminal (terminal on the lower side in the drawing) of the capacitor C4. When the MOSFET Q14 is turned off at the start of period T26, the current flowing through the MOSFET Q14 is blocked, causing the current to flow through the path P54 passing through the coil L5, the MOSFET Q13, and the secondary winding of the transformer TR3 (refer to FIG. 32). As a result, the current flows from the first end to the second end of the secondary winding of the transformer TR3, voltage is induced in the primary winding of the transformer TR3, and the current I1T flows. The flow of the current I1T reduces the voltage VQ11SD.

The switching loss can be reduced by turning the MOSFET Q11 on after the voltage VQ11SD is reduced. In particular, the switching loss can be reduced by turning the MOSFET Q11 on after the voltage VQ11SD is reduced to substantially 0. Thus, the power supply 3 transmits the power stored in the capacitor C4 of the secondary circuit 50 to the primary circuit 40 and turns on the MOSFET Q11 after the source-drain voltage of the MOSFET Q11 is reduced. As a result, the switching loss can be reduced at the on operation of the MOSFET Q11.

As described above, in the power supply 3 according to the present embodiment, the rectifier circuit (secondary circuit 50) includes the first switching element (MOSFET Q13) and second switching element (MOSFET Q14) as rectifier elements; and the coil L5. The first end (upper end in the drawing) of the capacitor C4 is connected to the first end (upper end in the drawing) of the secondary winding of the transformer TR3 with the coil L5 and the first switching element (MOSFET Q13) therebetween and is connected to the second end (lower end in the drawing) of the secondary winding with the coil L5 and the second switching element (MOSFET Q14) therebetween. The second end (lower end in the drawing) of the capacitor C4 is connected to the second end of the secondary winding. The rectifier circuit performs, as a discharge operation, an operation of causing a current to flow into the path P53 passing through the coil L5 and the second switching element to start discharge of the capacitor C4; and an operation of subsequently turning the second switching element off to cause a current to flow into the path P54 passing through the coil L5, the first switching element and the secondary winding.

Thus, according to the power supply 3 of the present embodiment, a current is made to flow through the path P53 passing through the coil L5 and the second switching element to start discharge of the capacitor, and subsequently the second switching element is turned off, making it possible to cause a current to flow into the secondary winding of the transformer TR3 and to reduce the voltage (source-drain voltage) between the conduction electrodes of the switching elements included in the switching circuit even during low output. Accordingly, it is possible to reduce the switching loss in the switching elements and increase the power conversion efficiency even during low output.

Further, because the switching circuit (the primary circuit 40) is a forward circuit, it is possible to provide a power supply that includes a forward circuit as the switching circuit and has a high power-conversion efficiency even during low output.

Fourth Embodiment

Figure 34:
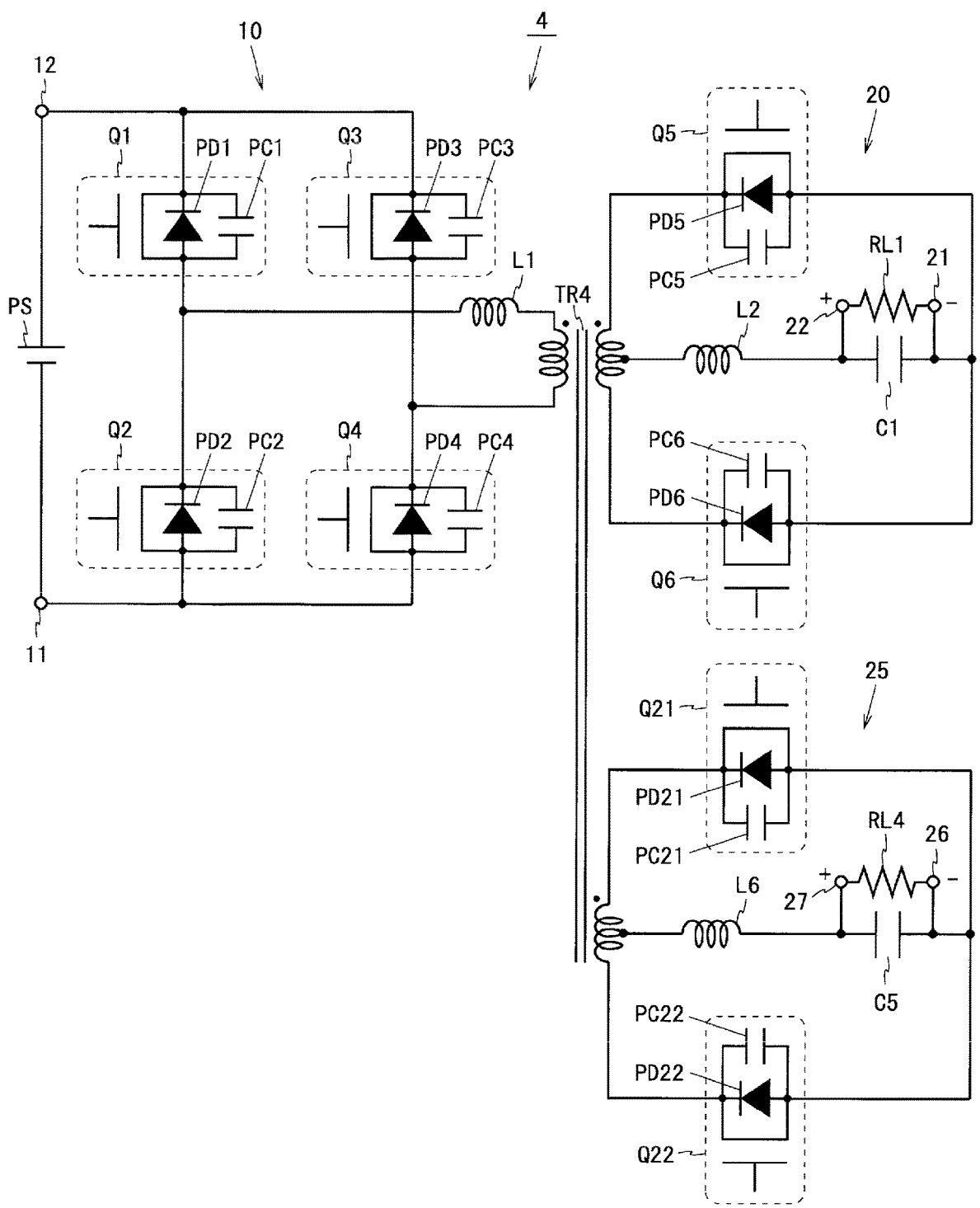
FIG. 34 is a circuit diagram of a power supply according to a fourth embodiment.

FIG. 34 is a circuit diagram of a power supply according to a fourth embodiment. A power supply 4 illustrated in FIG. 34 is a DC/DC converter including MOSFETs Q1 to Q6, Q21, Q22, a transformer TR4, coils L1, L2, L6 and capacitors C1, C5. The power supply 4 is configured by adding a secondary circuit 25 to the power supply 1 according to the first embodiment and thus includes a plurality of secondary circuits. For each of the secondary circuits 20, 25, a rated output voltage and a rated output current can be set. Note that the power supply 4 may include three or more secondary circuits.

The secondary circuit 25 has the same configuration as the secondary circuit 20. The secondary circuit 25 includes the MOSFETs Q21, Q22, the capacitor C5, and the coil L6. The secondary circuit 25 includes a first output terminal 26 as a negative output terminal and a second output terminal 27 as a positive output terminal. The MOSFETs Q21, Q22 respectively include parasitic diodes PD21, PD22 and parasitic capacitors PC21, PC22. A load RL4 is connected between the first and second output terminals 26, 27. The transformer TR4 includes two secondary windings. The secondary circuits 20, 25 share the transformer TR4 and are respectively supplied with power from the two secondary windings of the transformer TR4.

In the power supply 4, to perform zero voltage switching in MOSFETs Q to Q4, the power stored in the capacitor C1 may be transmitted to the primary circuit 10 by a switching operation of the MOSFETs Q5, Q6. Alternatively, the power stored in the capacitor C5 may be transmitted to the primary circuit 10 by a switching operation of the MOSFETs Q21, Q22. Alternatively, the power stored in both the capacitors C1, C5 may be transmitted to the primary circuit 10.

As described above, in the power supply 4 according to the present embodiment, a plurality of rectifier circuits (the secondary circuits 20, 25) are provided on the secondary side of the transformer TR4. Thus, according to the power supply 4 according to the present embodiment, it is possible to reduce the switching loss in the switching elements (MOSFETs Q1 to Q4) included in the switching circuit (primary circuit 10) and increase the power conversion efficiency even during low output, similar to the first embodiment. Further, the plurality of rectifier circuits capable of transmitting the power stored in the capacitor to the switching circuit are provided, making it possible to transmit a larger amount of power from the plurality of rectifier circuits to the switching circuit and reduce the switching loss in the switching elements included in the switching circuit even during low output.

Note that here the power supply 4 including a plurality of secondary circuits is configured on the basis of the power supply 1 according to the first embodiment. However, the power supply including the plurality of secondary circuits may be configured instead on the basis of the power supply according to the second or third embodiment or the power supply according to the modified examples of the respective embodiments.

Fifth Embodiment

Figure 35:
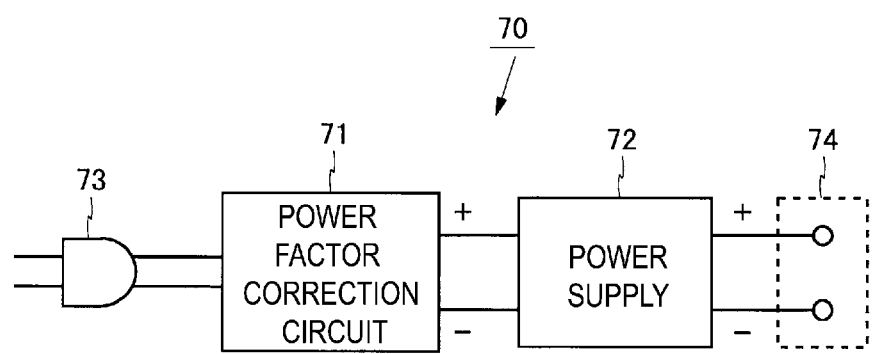
FIG. 35 is a block diagram of a power supply unit according to a fifth embodiment.
Figure 36:
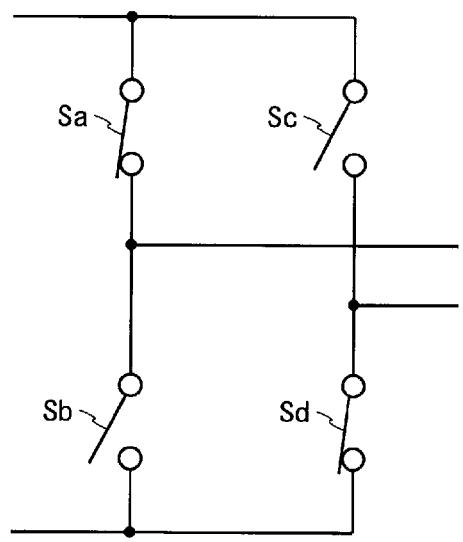
FIG. 36 is a circuit diagram of a full-bridge circuit.

FIG. 35 is a circuit diagram of a power supply unit according to a fifth embodiment. A power supply unit 70 illustrated in FIG. 35 includes a power factor correction circuit 71, a power supply 72, an alternating current (AC) plug 73, and an output terminal 74. The power supply 72 is any one of the power supplies according to the first to fourth embodiments and the modified examples thereof.

The power factor correction circuit 71 performs control so that the input voltage and input current are substantially proportional and suppresses the generation of harmonics. The power factor correction circuit 71 outputs 400 V direct current voltage in a case that an alternating voltage of from 100 to 240 V is input, for example. The power supply 72 converts the direct current voltage output from the power factor correction circuit 71 to a direct current voltage of a desired level. The power supply unit 70 can be used as an AC adapter or a power supply built into an electric device.

As described above, the power supply unit 70 according to the present embodiment includes any one of the power supplies according to the first to fourth embodiments and the modified examples thereof. Thus, according to the power supply unit 70 according to the present embodiment, it is possible to provide a power supply unit having a high power-conversion efficiency even during low output.

Note that the power supply having the features of the plurality of embodiments and the modified examples may be configured by any combination of the features of the power supplies according to the first to fourth embodiments and the modified examples thereof as long as the nature of the power supply is not adversely affected.

As described above, a power supply may include a transformer, a switching circuit connected to a primary winding of the transformer, and a rectifier circuit connected to a secondary winding of the transformer. The switching circuit may include a switching element including a first conduction electrode and a second conduction electrode and configured to be switchable between an on state and an off state. The rectifier circuit may include a rectifier element configured to rectify power transmitted from a primary side of the transformer and may include a capacitor configured to store the power that is rectified. The rectifier circuit may be configured to perform a discharge operation of discharging the capacitor and causing a current to flow into the secondary winding of the transformer to reduce a voltage between the first conduction electrode and the second conduction electrode of the switching element before the switching element is switched from the off state to the on state (first aspect).

The rectifier circuit may include a first switching element and a second switching element as the rectifier element and further include a coil. The secondary winding may include a center tap. A first end of the capacitor may be connected to a first end of the secondary winding with the first switching element between the first end of the capacitor and the first end of the secondary winding and may be connected to a second end of the secondary winding with the second switching element between the first end of the capacitor and the second end of the secondary winding, and a second end of the capacitor may be connected to the center tap with the coil between the second end of the capacitor and the center tap. The rectifier circuit may, as the discharge operation, be configured to cause a current to flow into a path passing through the coil, the center tap, the first end of the secondary winding, and the first switching element; and into a path passing through the coil, the center tap, the second end of the secondary winding, and the second switching element to start discharge of the capacitor and then to turn off the second switching element (second aspect).

The rectifier circuit may include a first switching element and a second switching element as the rectifier element and further include a first coil and a second coil. A first end of the capacitor may be connected to a first end of the secondary winding with the first switching element between the first end of the capacitor and the first end of the secondary winding and may be connected to a second end of the secondary winding with the second switching element between the first end of the capacitor and the second end of the secondary winding, and a second end of the capacitor may be connected to the first end of the secondary winding with the first coil between the second end of the capacitor and the first end of the secondary winding and may be connected to the second end of the secondary winding with the second coil between the second end of the capacitor and the second end of the secondary winding. The rectifier circuit may, as the discharge operation, be configured to cause a current to flow into a path passing through the second coil and the second switching element to start discharge of the capacitor and subsequently to turn off the second switching element to cause a current to flow into a path passing through the second coil, the secondary winding, and the first switching element (third aspect).

The rectifier circuit may include a first switching element and a second switching element as the rectifier element and further include a coil. A first end of the capacitor may be connected to a first end of the secondary winding with the coil and the first switching element between the first end of the capacitor and the first end of the secondary winding and may be connected to a second end of the secondary winding with the coil and the second switching element between the first end of the capacitor and the secondary end of the secondary winding, and a second end of the capacitor may be connected to the second end of the secondary winding. The rectifier circuit may, as the discharge operation, be configured to cause a current to flow into a path passing through the coil and the second switching element to start discharge of the capacitor and subsequently to turn off the second switching element to cause a current to flow into a path passing through the coil, the first switching element, and the secondary winding (fourth aspect).

The switching circuit may be a full-bridge circuit (fifth aspect). The switching circuit may be a forward circuit (sixth aspect). A plurality of the rectifier circuits may be provided to a secondary side of the transformer (seventh aspect). A power supply unit may include the power supply according to any of the first to seventh aspects (eighth aspect).

According to the first aspect, the capacitor included in the rectifier circuit is discharged, causing a current to flow into the secondary winding of the transformer, and the power stored in the capacitor is transmitted to the switching circuit via the transformer, reducing the voltage between the conduction electrodes of the switching element included in the switching circuit even during low output. After the voltage between the conduction electrodes is reduced, the switching element is switched to the on state, making it possible to reduce the switching loss in the switching element even during low output. In particular, after the voltage between the conduction electrodes is reduced to substantially zero, the switching element is switched to the on state, making it possible to perform zero voltage switching and reduce the switching loss even during low output. Thus, it is possible to provide a power supply that has high power-conversion efficiency even during low output and is highly efficient across a wide output range from low output to high output.

According to the second aspect, in the rectifier circuit having the configuration described above, a current is made to flow through the two paths to start discharge of the capacitor, and subsequently the second switching element is turned off, making it possible to cause a current to flow into the secondary winding of the transformer and to reduce the voltage between the conduction electrodes of the switching element included in the switching circuit even during low output. Accordingly, it is possible to reduce the switching loss in the switching element and increase the power conversion efficiency even during low output.

According to the third aspect, in the rectifier circuit having the configuration described above, a current is made to flow through the second switching element and the second coil to start discharge of the capacitor, and subsequently the second switching element is turned off, making it possible to cause a current to flow into the secondary winding of the transformer and to reduce the voltage between the conduction electrodes of the switching element included in the switching circuit even during low output. Accordingly, it is possible to reduce the switching loss in the switching element and increase the power conversion efficiency even during low output.

According to the fourth aspect, in the rectifier circuit having the configuration described above, a current is made to flow through the coil and the second switching element to start discharge of the capacitor, and subsequently the second switching element is turned off, making it possible to cause a current to flow into the secondary winding of the transformer and to reduce the voltage between the conduction electrodes of the switching element included in the switching circuit even during low output. Accordingly, it is possible to reduce the switching loss in the switching element and increase the power conversion efficiency even during low output.

According to the fifth aspect, it is possible to provide a power supply that includes a full-bridge circuit as the switching circuit and has high power-conversion efficiency even during low output. According to the sixth aspect, it is possible to provide a power supply that includes a forward circuit as the switching circuit and has high power-conversion efficiency even during low output. According to the seventh aspect, it is possible to reduce the switching loss in the switching element included in the switching circuit and increase the power conversion efficiency even during low output. Further, it is possible to transmit a larger amount of power from the plurality of rectifier circuits to the switching circuit and reduce the switching loss in the switching element included in the switching circuit even during low output. According to the eighth aspect, it is possible to provide a power supply unit having a high power-conversion efficiency even during low output.

This application claims the benefit of priority to Japanese Patent Application Number 2017-31949 entitled "Power Supply and Power Supply Unit" filed on Feb. 23, 2017. The entire contents of the above-identified application are hereby incorporated herein by reference.

REFERENCE SIGNS LIST 1 to 4 Power supply
10, 15, 40 Primary circuit
20, 25, 30, 50 Secondary circuit
11, 41 First input terminal
12, 42 Second input terminal
21, 26, 31, 51 First output terminal
22, 27, 32, 52 Second output terminal
70 Power supply unit
71 Power factor correction circuit
72 Power supply
73 AC plug
74 Output terminal

The invention claimed is:

1. A power supply comprising:
a transformer;
a switching circuit connected to a primary winding of the transformer; and
a rectifier circuit connected to a secondary winding of the transformer,
wherein the switching circuit includes a switching element including a first conduction electrode and a second conduction electrode and configured to be switchable between an on state and an off state,
the rectifier circuit includes a rectifier element configured to rectify power transmitted from a primary side of the transformer and includes a capacitor configured to store the power that is rectified, and
the rectifier circuit is configured to perform a discharge operation of discharging the capacitor and causing a current to flow into the secondary winding of the transformer to reduce a voltage between the first conduction electrode and the second conduction electrode of the switching element before the switching element is switched from the off state to the on state.

2. The power supply according to claim 1,
wherein the rectifier circuit includes a first switching element and a second switching element as the rectifier element and further includes a coil,
the secondary winding includes a center tap,
a first end of the capacitor is connected to a first end of the secondary winding with the first switching element between the first end of the capacitor and the first end of the secondary winding and is connected to a second end of the secondary winding with the second switching element between the first end of the capacitor and the second end of the secondary winding, and a second end of the capacitor is connected to the center tap with the coil between the second end of the capacitor and the center tap, and
the rectifier circuit, as the discharge operation, is configured to cause a current to flow into a path passing through the coil, the center tap, the first end of the secondary winding, and the first switching element and into a path passing through the coil, the center tap, the second end of the secondary winding, and the second switching element to start discharge of the capacitor and then to turn off the second switching element.

3. The power supply according to claim 1,
wherein the rectifier circuit includes a first switching element and a second switching element as the rectifier element and further includes a first coil and a second coil,
a first end of the capacitor is connected to a first end of the secondary winding with the first switching element between the first end of the capacitor and the first end of the secondary winding and is connected to a second end of the secondary winding with the second switching element between the first end of the capacitor and the second end of the secondary winding, and a second end of the capacitor is connected to the first end of the secondary winding with the first coil between the second end of the capacitor and the first end of the secondary winding and is connected to the second end of the secondary winding with the second coil between the second end of the capacitor and the second end of the secondary winding, and
the rectifier circuit, as the discharge operation, is configured to cause a current to flow into a path passing through the second coil and the second switching element to start discharge of the capacitor and subsequently to turn off the second switching element to cause a current to flow into a path passing through the second coil, the secondary winding, and the first switching element.

4. The power supply according to claim 1,
wherein the rectifier circuit includes a first switching element and a second switching element as the rectifier element and further includes a coil,
a first end of the capacitor is connected to a first end of the secondary winding with the coil and the first switching element between the first end of the capacitor and the first end of the secondary winding and is connected to a second end of the secondary winding with the coil and the second switching element between the first end of the capacitor and the second end of the secondary winding, and a second end of the capacitor is connected to the second end of the secondary winding, and
the rectifier circuit, as the discharge operation, is configured to cause a current to flow into a path passing through the coil and the second switching element to start discharge of the capacitor and subsequently to turn off the second switching element to cause a current to flow into a path passing through the coil, the first switching element, and the secondary winding.

5. The power supply according to claim 1,
wherein the switching circuit is a full-bridge circuit.

6. The power supply according to claim 1,
wherein the switching circuit is a forward circuit.

7. The power supply according to claim 1,
wherein a plurality of the rectifier circuits are provided to a secondary side of the transformer.

8. A power supply unit comprising:
the power supply according to claim 1.

9. A power supply unit comprising:
the power supply according to claim 2.

10. A power supply unit comprising:
the power supply according to claim 3.

11. A power supply unit comprising:
the power supply according to claim 4.

12. A power supply unit comprising:
the power supply according to claim 5.

13. A power supply unit comprising:
the power supply according to claim 6.

14. A power supply unit comprising:
the power supply according to claim 7.

\* \* \* \* \*